(12) United States Patent
Child et al.

(10) Patent No.: US 11,570,401 B2
(45) Date of Patent: *Jan. 31, 2023

(54) DIGITAL ZOOM CONFERENCING

(71) Applicant: Vivint, Inc., Provo, UT (US)

(72) Inventors: Michael D. Child, Draper, UT (US); Michelle Zundel, Draper, UT (US)

(73) Assignee: VIVINT, INC., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,591

(22) Filed: Sep. 9, 2019

(65) Prior Publication Data

US 2020/0077045 A1 Mar. 5, 2020

Related U.S. Application Data

(63) Continuation of application No. 15/001,998, filed on Jan. 20, 2016, now Pat. No. 10,412,342, which is a continuation-in-part of application No. 14/575,830, filed on Dec. 18, 2014, now Pat. No. 10,417,883.

(51) Int. Cl.
| | |
|---|---|
| *H04N 7/14* | (2006.01) |
| *H04N 5/232* | (2006.01) |
| *G06V 40/16* | (2022.01) |
| *G06V 20/40* | (2022.01) |
| *G06V 40/20* | (2022.01) |

(52) U.S. Cl.
CPC ............ *H04N 7/141* (2013.01); *G06V 20/48* (2022.01); *G06V 40/174* (2022.01); *G06V 40/20* (2022.01); *H04N 5/23212* (2013.01); *H04N 5/23218* (2018.08); *H04N 5/23296* (2013.01)

(58) Field of Classification Search
None
See application file for complete search history.

(56) References Cited

U.S. PATENT DOCUMENTS

| | | | |
|---|---|---|---|
| 3,935,994 | A | 2/1976 | Darvishian |
| 5,844,599 | A | 12/1998 | Hildin |
| 6,462,659 | B1 | 10/2002 | Schuette |
| 6,493,022 | B1 | 12/2002 | Ho et al. |
| 6,967,575 | B1 | 11/2005 | Dohrmann et al. |
| 7,187,279 | B2 | 3/2007 | Chung |
| 7,504,942 | B2 | 3/2009 | Marman |

(Continued)

FOREIGN PATENT DOCUMENTS

| | | |
|---|---|---|
| CN | 1529290 A | 9/2004 |
| JP | 2005294927 A | 10/2005 |

(Continued)

OTHER PUBLICATIONS

Extended European Search Report for EP Application No. 15870894.1, dated Jun. 20, 2018.

(Continued)

*Primary Examiner* — Nancy Bitar
(74) *Attorney, Agent, or Firm* — Kunzler Bean & Adamson

(57) ABSTRACT

Methods, apparatuses, and techniques for security and/or automation systems are described. In one embodiment, the method including identifying a presence of a first person at a first location, capturing a first video related to the first person at the first location, and initiating an adjustment of a display of the first video based at least in part on identifying the presence of the first person.

20 Claims, 14 Drawing Sheets

(56) References Cited

U.S. PATENT DOCUMENTS

| | | | |
|---|---|---|---|
| 7,528,722 | B2 | 5/2009 | Nelson |
| 7,671,718 | B2 | 3/2010 | Turner et al. |
| 7,683,940 | B2 | 3/2010 | Fleming |
| 7,765,131 | B2 | 7/2010 | Klingenberg et al. |
| 7,847,820 | B2 | 12/2010 | Vallone et al. |
| 7,945,032 | B2 | 5/2011 | Elberbaum |
| 8,054,340 | B2 | 11/2011 | Miki et al. |
| 8,120,459 | B2 | 2/2012 | Kwak |
| 8,139,098 | B2 * | 3/2012 | Carter ............... H04M 11/00 348/14.06 |
| 8,164,452 | B2 | 4/2012 | Moses et al. |
| 8,297,494 | B1 | 10/2012 | Davis et al. |
| 8,350,694 | B1 | 1/2013 | Trundle et al. |
| 8,504,103 | B2 | 8/2013 | Ficquette |
| 8,675,074 | B2 | 3/2014 | Salgar et al. |
| 8,773,499 | B2 | 7/2014 | Watson et al. |
| 8,842,161 | B2 | 9/2014 | Feng et al. |
| 8,937,661 | B1 * | 1/2015 | Slavin ............ G08B 13/19654 348/143 |
| 9,070,175 | B2 | 6/2015 | Hurst |
| 9,237,330 | B2 | 1/2016 | Wang et al. |
| 9,299,350 | B1 * | 3/2016 | Dumont ............... G10L 17/10 |
| 9,354,794 | B2 | 5/2016 | Kirkby et al. |
| 9,420,331 | B2 | 8/2016 | Laska et al. |
| 9,449,229 | B1 | 9/2016 | Chaudhry et al. |
| 9,508,239 | B1 | 11/2016 | Harrison et al. |
| 9,799,183 | B2 | 10/2017 | Harrison et al. |
| 9,990,784 | B2 | 6/2018 | McMahan et al. |
| 10,217,076 | B2 | 2/2019 | Duquene et al. |
| 10,412,342 | B2 | 9/2019 | Child et al. |
| 10,417,883 | B2 | 9/2019 | Bunker et al. |
| 2002/0140814 | A1 * | 10/2002 | Cohen-Solal ......... G01S 3/7865 348/172 |
| 2004/0080615 | A1 | 4/2004 | Klein et al. |
| 2004/0085205 | A1 | 5/2004 | Yeh |
| 2005/0034420 | A1 | 2/2005 | Radlinger et al. |
| 2005/0104730 | A1 | 5/2005 | Yang |
| 2005/0225637 | A1 | 10/2005 | Eghbalian |
| 2006/0126893 | A1 | 6/2006 | Tran et al. |
| 2007/0103542 | A1 | 5/2007 | Carter |
| 2007/0115390 | A1 | 5/2007 | Makara et al. |
| 2009/0251545 | A1 | 10/2009 | Shekarri et al. |
| 2009/0315712 | A1 * | 12/2009 | Bloemendaal ... G08B 13/19656 340/541 |
| 2010/0225455 | A1 * | 9/2010 | Claiborne ................ G08B 3/10 340/384.7 |
| 2010/0238262 | A1 | 9/2010 | Kurtz et al. |
| 2011/0052155 | A1 | 3/2011 | Desmarais et al. |
| 2012/0019674 | A1 | 1/2012 | Ohnishi et al. |
| 2012/0188377 | A1 | 7/2012 | Kundu et al. |
| 2013/0088565 | A1 * | 4/2013 | Buckler .................. H04N 7/15 348/14.08 |
| 2013/0295913 | A1 * | 11/2013 | Matthews, III ... H04M 1/72463 455/420 |
| 2014/0118541 | A1 | 5/2014 | Lasko |
| 2014/0149308 | A1 | 5/2014 | Ming |
| 2014/0267716 | A1 * | 9/2014 | Child ..................... H04N 7/186 348/143 |
| 2014/0267834 | A1 | 9/2014 | Aoki |
| 2015/0016665 | A1 | 1/2015 | Tanner |
| 2015/0054949 | A1 | 2/2015 | Scalisi |
| 2015/0112972 | A1 | 4/2015 | Petrou et al. |
| 2015/0145643 | A1 | 5/2015 | Fadell et al. |
| 2015/0146078 | A1 | 5/2015 | Aarrestad et al. |
| 2015/0163463 | A1 * | 6/2015 | Hwang ................. H04N 7/188 348/143 |
| 2017/0132888 | A1 | 5/2017 | Conlon et al. |
| 2017/0229071 | A1 * | 8/2017 | McMahan ............. G09G 3/344 |
| 2018/0053365 | A1 | 2/2018 | Bode et al. |
| 2018/0261060 | A1 * | 9/2018 | Siminoff ......... G08B 13/19628 |
| 2019/0114060 | A1 * | 4/2019 | Resudek ................. G06F 21/32 |

FOREIGN PATENT DOCUMENTS

| | | |
|---|---|---|
| JP | 2009282954 A | 12/2009 |
| KR | 1020110109147 A | 10/2011 |
| KR | 1020120057779 A | 6/2012 |
| WO | 2016109838 A1 | 7/2016 |

OTHER PUBLICATIONS

PCT International Search Report for International Application No. PCT/US2015/065868, dated Apr. 6, 2016 (3 pp.).

WO/2010/020851 english translation ; • Tessier, Cedric et al. ; Publication Date Feb. 25, 2010, International Application No. PCT/IB2009/006462, International Filing Date Aug. 4, 2009 (Year 2010).

* cited by examiner

DIGITAL ZOOM CONFERENCING

CROSS-REFERENCE TO RELATED APPLICATION

This application is a continuation of U.S. patent application Ser. No. 15/001,998, filed Jan. 20, 2016, titled "Digital Zoom Conferencing," which is a continuation-in-part of U.S. patent application Ser. No. 14/575,830, filed Dec. 18, 2014, titled "Doorbell Camera Package Detection," the disclosures of which are hereby incorporated by reference in their entirety.

BACKGROUND

The present disclosure relates to security and/or automation systems, and more specifically to methods and systems related to digital zoom conferencing. Security and automation systems are widely deployed to provide various types of communication and functional features such as monitoring, communication, notification, and/or others. These systems may be capable of supporting communication with a user through a communication connection or a system management action.

Current video conferencing systems require manual adjustment of the camera based on what is happening in the room. For example, if multiple people are going to speak in a room, the camera may be set to capture all of the participants, regardless of whether some of them are not speaking. This can make it difficult to concentrate on and see the speaker.

SUMMARY

The systems and methods described herein relate generally to audio and/or video calls, and in some cases are related to cameras located inside a building and, more specifically, inside an interior room of a home. The camera may be enabled to use digital and/or optical zoom techniques, as well as caller identification techniques (among others) to improve video conferencing.

In one embodiment, a method for automation and/or security is described. The method may include identifying a presence of a first person at a first location, capturing a first video related to the first person at the first location, and/or initiating an adjustment of a display of the first video based at least in part on identifying the presence of the first person.

In one embodiment, an apparatus for automation and/or security is described. The apparatus may include a processor, memory in electronic communication with the processor, and instructions stored in the memory, the instructions causing the processor to identify a presence of a first person at a first location, capture a first video related to the first person at the first location, and/or initiate an adjustment of a display of the first video based at least in part on identifying the presence of the first person.

In one embodiment, a non-transitory computer-readable medium is described. The non-transitory computer-readable medium stores code, the code comprising instructions executable to identify a presence of a first person at a first location, capture a first video related to the first person at the first location, and initiate an adjustment of a display of the first video based at least in part on identifying the presence of the first person. In some embodiments, the first location may be located within an indoor room. In some embodiments, the first video may be captured upon determining the first person is creating an audible noise.

In some embodiments, the method, apparatus, and non-transitory medium may adjust the display of the first video during a video call. The adjustment may further include adjusting a digital and/or optical zoom level of the first video such that an image of the first person may include a pre-determined percentage of an area of the display. The digital and/or optical zoom level may involve scaling the image of the first person using an interpolation algorithm. Adjusting the display may further involve receiving data indicating a quality of the image data and initiating an adjustment of the quality of the image.

In some embodiments, the method, apparatus, and non-transitory computer-readable medium may further describe comparing a first portion of the image data and a second portion of the image data, determining that a section of the image data is backlit based at least in part on the comparing, wherein initiating the adjustment comprises adjusting a focus on the first person based at least in part on the determining the section of the image data is backlit.

In some embodiments, the method, apparatus, and non-transitory computer-readable medium may further identify the presence of a second person at a second location. The second location may be a different location within the same indoor room as the first person. It may further be determined the first person and/or the second person are creating an audible noise, and the display of the first video may be adjusted to include the first person and/or the second person. In some embodiments, the display of the first video may be adjusted to include an image of the second person alone upon determining the second person is creating an audible noise. In some embodiments, the display of the first and/or second person is based on a user preference.

In some embodiments, the method, apparatus, and non-transitory computer-readable medium may further identify the first person and/or the second person based at least in part on the first video, where identification may be based at least in part on comparing biometric data between the first person and/or second person and/or user profiles.

In some embodiments, the method, apparatus, and non-transitory computer-readable medium may further include tracking a movement of the first person within a room, and capture the movement of the first person as at least part of the first video.

In other embodiments, the systems and methods described herein relate to camera package detection, and in some cases are related to external cameras (e.g., doorbell cameras). A camera may be used to capture one or more images of a premises. Image analysis may be performed on the one or more captured images to identify the presence of an object. The object may be identified as a package based at least in part on the image analysis. Upon identifying the object as a package, the systems and methods may monitor the package for unauthorized interaction.

In one embodiment, the method may include identifying image data from a signal, analyzing the image data based at least in part on a first parameter, identifying a presence of an object based at least in part on the analyzing, and detecting an object event based at least in part on the identifying. The image data may include a first set of image data and a second set of image data, the second set of image data being captured after the first set of image data. The first parameter may include image analysis data to detect at least one of shape, color, texture, material, and reflectivity of the image data. The image data may include at least one of photo data and video data, motion detection data based at least in part on a motion of the object, and/or facial recognition data.

In some embodiments, analyzing the image data may include comparing at least a portion of an earlier set of image data with at least a portion of a later set of image data. Additionally, or alternatively, analyzing the image data may include analyzing at least one subset of the image data. In some cases, the method may include sending a notification to a user based at least in part on the assessing. In some cases, a notification may be sent to a user based at least in part on whether a probability of the object event exceeds a predetermined probability threshold.

In some embodiments, analyzing the image data may be based at least in part on a second parameter. Accordingly, the method may include analyzing a first parameter and analyzing a second parameter in relation to the analysis of the first parameter. In some cases, assessing the probability of the object event may include assessing a first probability of the object event based at least in part on analyzing the image data based at least in part on the first parameter, and assessing a second probability of the object event based at least in part on analyzing the image data based at least in part on the second parameter.

A computing device configured for doorbell camera package detection is also described. The computing device may include a processor and memory in electronic communication with the processor. The memory may store computer executable instructions that when executed by the processor cause the processor to perform the steps of identifying image data from a signal, analyzing the image data based at least in part on a first parameter, identifying a presence of an object based at least in part on the analyzing, and detecting an object event based at least in part on the identifying.

A non-transitory computer-readable storage medium storing computer executable instructions is also described. When the instructions are executed by a processor, the execution of the instructions may cause the processor to perform the steps of identifying image data from a signal, analyzing the image data based at least in part on a first parameter, identifying a presence of an object based at least in part on the analyzing, and detecting an object event based at least in part on the identifying.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
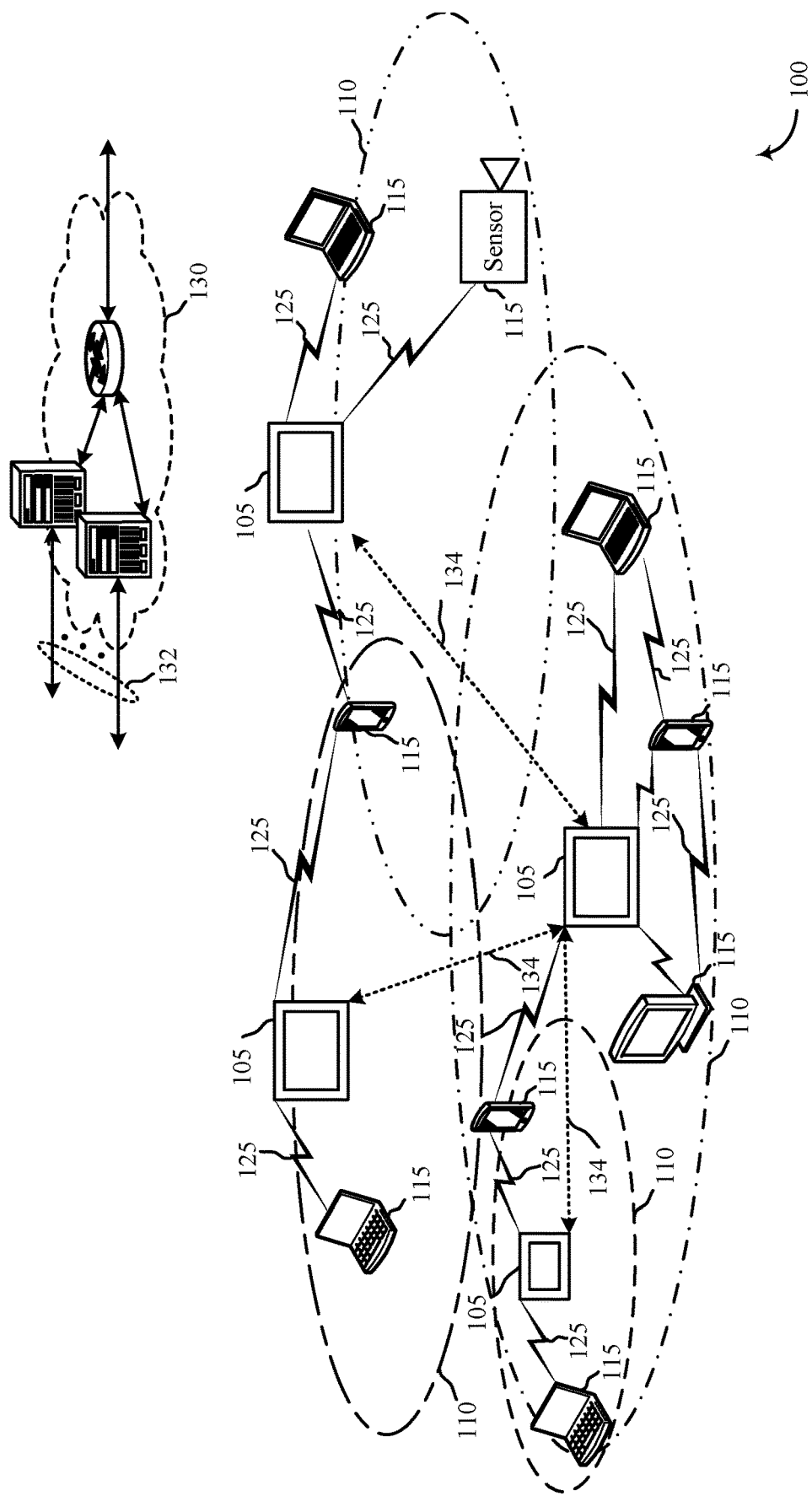
FIG. 1 shows a block diagram relating to an automation and/or security system in accordance with various aspects of this disclosure.

The systems, methods, and techniques described herein relate to identifying one or more people in a location and adjusting a video call to improve video call functionality and/or user experience. Based on identification of specific people, environmental elements (e.g., sound, light, infrared, vibrations, spatial considerations, etc.), and/or user preferences, a device (e.g., an audio/visual device, a camera coupled to a microphone) may adjust the video to enhance the call. In some embodiments, the device may be a stand-alone device that includes a couple, a speaker, and/or a microphone and may perform one or more communications of various types. In some embodiments, the device may initiate one or more adjustments and/or other operations. In other embodiments, the device may receive one or more initiated adjustments and/or operations from another component and/or element.

In other embodiments, the problems solved by the systems and methods described herein include recognizing when certain packages are delivered and/or picked up and identifying information related to the package. Current package delivery/pick-up services are not secure and related package delivery methods include problems such as improper notifications, delayed notifications, theft, and/or failing to notify the user about information related to one or more delivered/picked-up packages (e.g., delivery person, size of the package, timeliness, etc.).

The systems and methods solve these and other problems by using specific visual parameters for detecting information related to packages. In some embodiments, the systems and methods may provide a notification based at least in part on one or more probabilities that may be based at least in part on information related to package delivery/pick-up.

Some embodiments relate to systems, methods, and related devices for detecting information related to one or more packages that are delivered and/or picked up, specifically related to security/home automation systems.

The present systems and methods use computer vision technology (based on a camera) to detect information related to packages, including detecting: a package, a person carrying a package, characteristics related to a person carrying a package (e.g., facial features, uniform, vehicle, etc.), environmental information (e.g., light, weather, etc.), and/or other information.

In some embodiments, the system may detect information about a package including shape, size, color, labeling, material, etc. This may be based at least in part on algorithms related to: image processing techniques, edge detection, segmentation, shape detection, deformable part models, figure detection, background subtraction, object detection, and/or other information. In some embodiments, the detection may occur when a person is walking toward and/or away from an area (e.g., a front door) and/or when a package is left at an area.

The detection may be based on information that the system collects over time. This information may include general parameters, parameters specific to a structure, and/or may be based on one or more related areas. For example, the system may perform detection related to a nearby area in view—such as a front porch. The system may learn and/or store data (image, video, etc.) specific to the porch area and then perform a comparison of one piece of porch data (like a picture or a video taken on Nov. 1, 2014 with another piece of porch data (like a picture or a video taken on Nov. 5, 2014) to identify the presence or absence of a package. This learning may occur through image and/or video capturing over a period of time and then the system may compare one or more captured data points with one or more other captured data points. In some embodiments, after some data is captured, the later captured data may include motion-triggered capturing events (i.e., when motion occurs, the system then captures an image and/or a video and can then compare it to the early data set). The system may compare learned data (stored in a device, in a panel, and/or through a wireless cloud network, etc.) with the motion-triggered data.

The system may learn and/or store data relating to (as examples) lighting, texture, reflectivity, color, materials (stone, stucco, cardboard), shape, motion (street traffic, sidewalk traffic, etc.), behavioral patterns, and/or weather, etc. In some embodiments, this learning and/or storing of data may be specific to a structure or a scenario. For example, the system may analyze certain data based on facing a street (having constant movement via traffic), a wooded area (tree movement from wind), lighting conditions (with a western facing home), etc.

In some embodiments, along with the comparison based on the data, the detection may include examining movement related to a package. For example, by comparing porch data, the system may detect a package and it may look at other data indicating motion near the porch or business entrance (e.g., based on timing, proximity motion detection data, etc.) and use this data to aid in detection. The system may also analyze a person's clothing, logo, nametags, clipboards, facial features, and/or mannerisms (gait, posture, etc.).

In some embodiments, using the other additional data may increase a probability and/or a confidence level assessed. For example, identifying a package's presence based on image and/or video data of an area may yield a first probability and/or confidence level. Then, based on additional comparisons, calculations, analysis, identifications, and/or actions, the probability and/or confidence level may increase, stay the same, and/or decrease. For example, the probability may increase based at least in part on motion detection data, person detection data, clothing detection data, shape detection data, and/or uniform detection data, etc.

Based on a package detection, a system may provide a notification to a user and/or to a deliverer. A notification that a package has been delivered, picked up, and/or moved from a location (based at least in part on a probability and/or confidence level) may be sent to a user via text, email, social media, phone call, push notifications, and/or voicemail, etc. In addition, a notification to a user and/or to a deliverer may be based on environmental (e.g., inclement weather) and/or other factors, which may dictate the type of notification and/or influence the probability threshold for a notification (i.e., lower the threshold for any notification or a specific type of notification based on inclement weather).

The system may also help with theft prevention by notifying a user about a package and/or whether another person is approaching a door before and/or after a package has been delivered and/or picked up. In some embodiments, the system may capture detection data related to movement and/or other parameters to assist in determining probabilities related to preventing theft. In addition, in some cases, the system may also sound a visual and/or an audible alarm in response to certain analysis, data, identification, probabilities, and/or object events at least related to a potential theft. In addition, a notification to a delivery person may also be provided. For example, based on identifying that a package is delivered, the system may tell the delivery person to leave the package in a certain location (under a cover based on weather, in a garage, at a side door, with a receptionist, etc.) and/or provide additional instruction.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, modified, and/or combined. Also, features described with respect to some examples may be added, omitted, modified, and/or combined in other examples.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 and may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server—directly and/or indirectly—using one or more communication links.

The control panels 105 may wirelessly communicate with the devices 115 via one or more antennas. For example, the control panels 105 may communicate wirelessly with one or more cameras such as security cameras, doorbell cameras, etc. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a security camera, a doorbell camera, a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A device 115 may also include or be referred to by those skilled in the art as a user device, a sensor, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, a camera, and/or some other suitable terminology. A device 115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The communications system 100 may be configured to monitor an area outside a door of a home or business and/or configured to monitor one or more indoor rooms and/or areas. In conjunction with the control panels 105, devices 115, network 130, and communication links 125 and/or 134, the communications system 100 may be configured to identify the presence of one or more people in a location (such as a conference room or a living room) and adjust elements associated with a video call and/or video recording.

In some embodiments, the communications system 100 may be configured to monitor an area outside a door of a home or business. In conjunction with the control panels 105, devices 115, network 130, and communication links 125 and/or 134, the communications system 100 may be configured to detect a package at the area outside the door of the home or business. For example, a doorbell camera may be configured to capture one more or more images of the area, and based on the captured one or more images, the communications system 100 may detect a package being delivered to the area, being taken from the area, left at the area, etc. In some cases, the control panels 105 and/or devices 115 may perform image analysis on the one or more captured images to identify the presence of an object, and based on the image analysis, may identify the object as a package. Upon identifying the object as a package, one or more elements of the communications system 100 may be configured to monitor the package to detect events related to the package such as a person detected within view of the package, delivery of the package, pickup of the package, etc.

Figure 2:
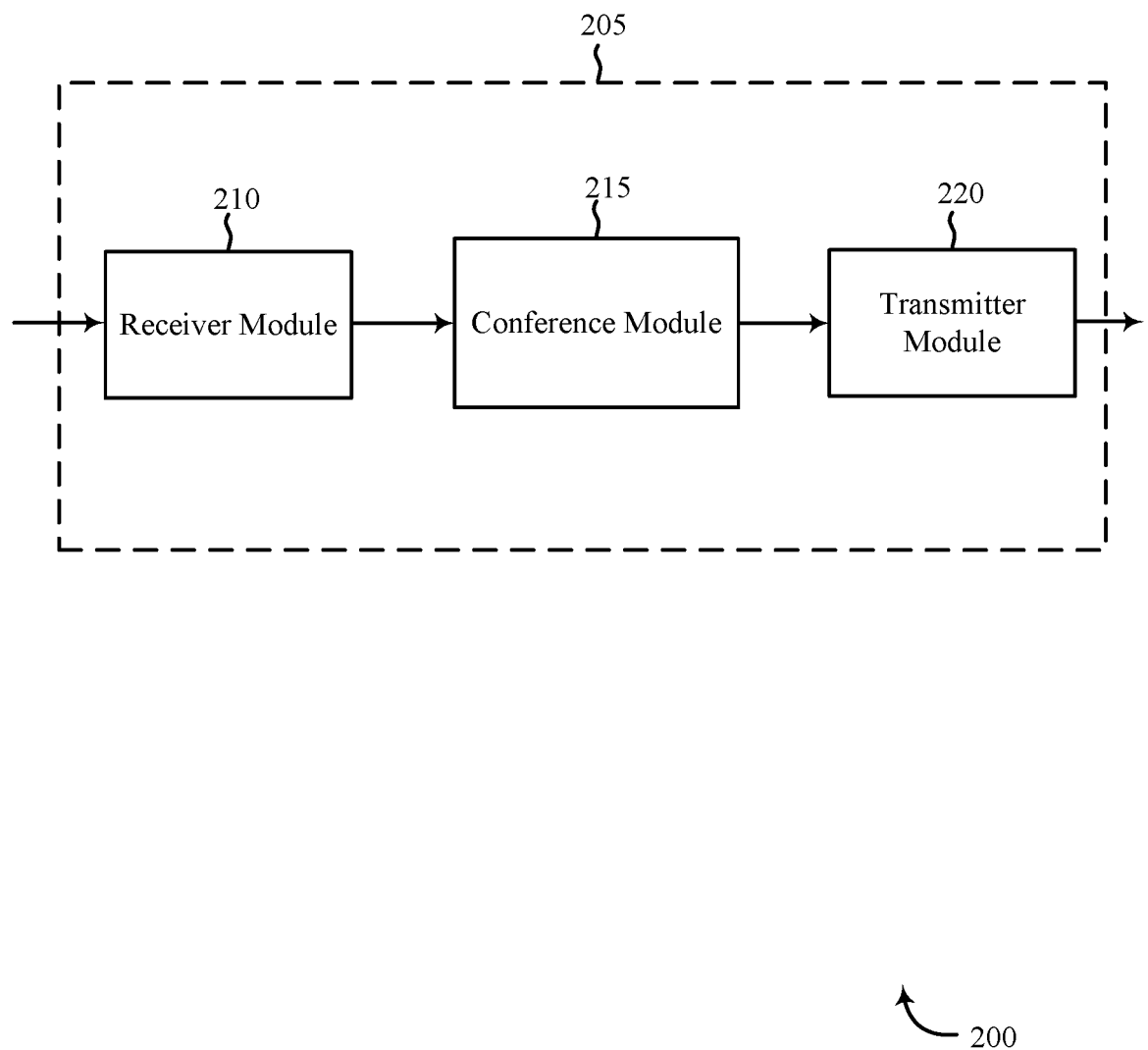
FIG. 2 shows a block diagram of a device relating to an automation and/or security system in accordance with various aspects of this disclosure.

FIG. 2 shows a block diagram 200 of an apparatus 205 for use in electronic communication, in accordance with various aspects of this disclosure. In one embodiment, the apparatus 205 may be an example of one or more aspects of a control panel 105 described with reference to FIG. 1. In some embodiments, apparatus 205 may be an example of a camera, as illustrated by device 115.

The apparatus 205 may include a receiver module 210, a conference module 215, and/or a transmitter module 220. The apparatus 205 may also include a processor. Each of these modules may be in communication with one another—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data and/or control information from another device such as a control panel, sensor, and/or a camera. Information may be passed on to the conference module 215, and to other components of the apparatus 205.

Conference module 215 enables enhanced video calls and/or audio and/or video recordings in some embodiments. Upon receiving one or more images and/or videos at the receiver module 210, conference module 215 performs image analysis based at least in part on the one or more images and/or videos to detect a person, a package and/or other item or feature. For example, upon detecting the presence of a person in a room, conference module may initiate a conference call (e.g., video call, VoIP call, audio call) and/or start recording audio and/or images which may be stored in memory for later retrieval. In another example, upon detecting a package and/or other feature (e.g., a bar code on a label on a package), the conference module 215 may monitor the package and determines whether a person that is delivering, moving, and/or removing the detected package is authorized to do so. The apparatus 205 may perform various functions based on this analysis and/or determination.

The transmitter module 220 may transmit the one or more signals received from other components of the apparatus 205. The transmitter module 220 may transmit data and/or controls signals to a control panel and/or sensor associated with the security and/or automation system. The data and/or control signals transmitted by the transmitter module 220 may be associated with the identification, audio/video capture, audio/video tracking, and audio/video adjustments performed by the conference module 215. In some examples, the transmitter module 220 may be co-located with the receiver module 210 in a transceiver module.

Figure 3:
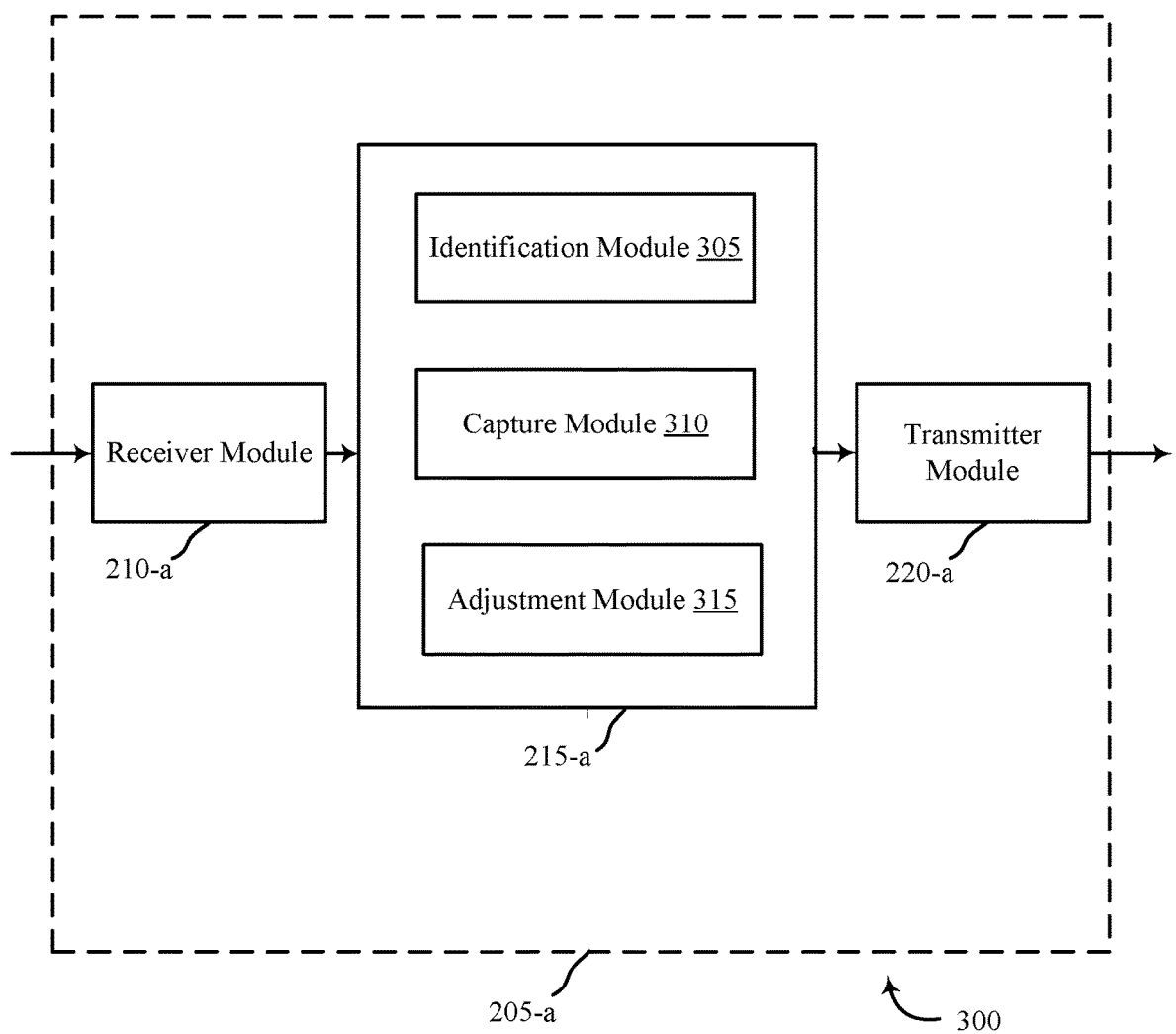
FIG. 3 shows a block diagram of a device relating to an automation and/or security system in accordance with various aspects of this disclosure.

FIG. 3 shows a block diagram 300 of an apparatus 205-a for use in video conferencing in accordance various aspects of this disclosure. The apparatus 205-a may be an example of one or more aspects of a control panel 105 and/or a device 115 described with reference to FIG. 1. Apparatus 205-a may also be an example of an apparatus 205 described with reference to FIG. 2. The apparatus 205-a may include a receiver module 210-a, a conference module 215-a, and/or a transmitter module 220-a, which may be examples of the corresponding modules of apparatus 205. The apparatus 205-a may also include a processor. Each of these components may be in communication with each other. The conference module 215-a may include an identification module 305, a capture module 310, and/or an adjustment module 315, among others. The receiver module 210-a and the transmitter module 220-a may perform the functions of the receiver module 210 and the transmitter module 220, of FIG. 2, respectively.

In one embodiment, identification module 305 may identify a presence of at least one person in a location (e.g., an indoor room such as a conference room, an areas within a room or an area, a living room, etc.) In some embodiments, identification module 305 may identify the presence of a second person in the same location, where in other embodiments, the identification module 305 may identify the presence of a second person in a second location. In both cases, the first and second people are participating on the same conference call. As with the first person, the system may determine the second person is making audible sounds (e.g., speaking, singing), and may make decisions based on such a determination.

In additional embodiments, identification module 305 may not just identify the presence of a person, but may identify the person's identity as well. For example, the identification module 305 may receive identifying information related to a person such as a voice print, facial recognition information, a height, a hair color and/or length, a body type and/or shape, other physical features, a fingerprint, a scan of a portion or the entire person's face, a scan of the person's retina, other biometric information, and/or some combination. In other embodiments, a card associated with the person may be read for information by way of a magnetic scanner, a radio frequency identification (RFID) chip, a quick-response (QR) code, a bar code, etc. In yet other embodiments, a personal identification number may be keyed into a input device (e.g., touchscreen, keypad). In other embodiments, a geo-fence may be established around the location, and it may be determined that a portable electronic device associated with the person and crossed into or out of a geo-fenced location. Regardless of the type of identification, the data may be compared to a user profile stored in memory and the person may be identified. In some embodiments, identities may be established based on a known user profile related to one or more locations. For example, there may be a plurality of previously stored user profiles which contain a variety of identifying features, authorizations, and/or preferences associated with a specific person. Thus, when a specific person is identified, the system may take an action indicated by the person's identity. In some embodiments, one or more distinct types of information may be received, analyzed, weighed, and/or compared to determine an identity.

In one embodiment, capture module 310 may capture a first video related to the person being in one or more locations. In particular, the camera may begin recording a video once a person is identified as being in the location and/or may record based on identifying the identity of the person in the location, among other factors. The video may be a wide view of the room which includes the person, or the video may be zoomed in on the person. In some embodiments, video capture may begin when one or more system components determines that the person is speaking and/or otherwise making sound. In some embodiments, video capture may begin when one or more system components determines that the person is moving in the room and/or the area. In some embodiments, the capture module 310 may track movement of at least one of the people in the location. For example, a person may walk around the room while speaking and/or may move to a different location. In some embodiments, movement and location may be determined by periodically or persistently re-determining identification and presence as described above. For example, a room may be divided into sections or zones, and the system may determine the presence of and/or identification of a person in section. Thus, if a person is identified to be located in a different section that in which the person was previously identified, the system knows the person has moved.

In one embodiment, adjustment module 315 may initiate an adjustment of the display and/or recording components of the video based at least in part on identifying the presence of and/or the identity of the first person, among others. In some embodiments, adjustment of the video may include adjusting a zoom level, a focal point of the camera (i.e., by panning and/or tilting), a resolution, a frame rate, a white balance, a gain, a sensitivity (e.g., ISO), a focus, a metering, a brightness, a saturation, a contrast, one or more highlights, one or more shadows, aperture and/or f-stop settings, a vibration sensitivity, some combination, and/or other settings. In some embodiments, the camera may employ a digital zoom, pan, tilt, and/or other adjustment, among other things. In some embodiments, this digital zoom may advantageously allow for one or more adjustments at increased rates compared to optical zooms, which in some instances can be limited based on motor and other mechanical-based and/or electrical-based constraints. In one example embodiment, the person may be facing the camera with a sunlit window behind him. Because the person is backlit, the camera may be adjusted to change the focus, the brightness level, and/or other adjustments to bring the person into better view. In some embodiments, the person may move from a dark area in the room to a backlit area, and thus the camera may be adjusted to account for the change of environment and/or related conditions.

In other embodiments, the display may be adjusted based on the identification of multiple people in at least one location. In some embodiments, the system may identify the presence of multiple people in different respective locations, but participating in the same conference call. In another embodiment, the system may comprise many cameras, such that a person can speak while walking through the home from room to room, and the appropriate camera (i.e., the camera located in the room in which the person is speaking), may activate to capture the video and transmit it to the conference call.

In some embodiments, the adjustments may be made before recording begins, whereas in some embodiments, the adjustments are made at the onset of recording and/or throughout the call. For example, before a person begins speaking, but after the person is identified as being in the location, the camera may zoom in on the person such that the person's torso occupies a pre-determined area of the display frame.

In some embodiments, identification, video capture, and adjustments may all be made based on user preferences. For example, a user may indicate that no matter who is present in a room and/or who is speaking, the camera should always zoom in on and focus on a first person whether she is speaking or not. In another example, the user may indicate that no matter who is present in the room and/or who is speaking, the entire room should be shown. In some embodiments, the user preferences may be stored as defaults. In other embodiments, a user can program the system to take specific actions based on the identification of a person. In some cases, even more refined preferences may be programmed by the user, such as determining if the identified person sounds distressed (e.g., shouting or yelling), is moving from room to room, the time of day, the day of the week, in which room the person is located (e.g., different actions may take place if the person is in a private bedroom versus a living room), and the like. In some embodiments, specific words or events may trigger specific events regardless of what user preferences are stored. For example, if the system identifies the word "help" or "I'm sick" or "call Mom," then one or more events may be triggered (including initiating a call to one or more designated contacts and/or sources). In yet other embodiments, the system may be pre-programmed to adjust the display based on which people are in the room (e.g., if two children are in the room, the system may always display both children regardless if neither, one, or both are speaking).

Figure 4A:
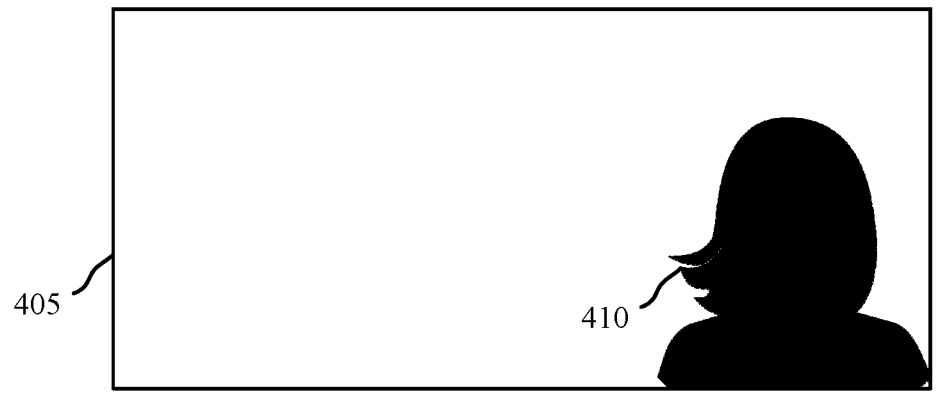
FIG. 4A shows an example perspective view of a video call related to an automation and/or security system in accordance with various aspects of this disclosure.
Figure 4B:
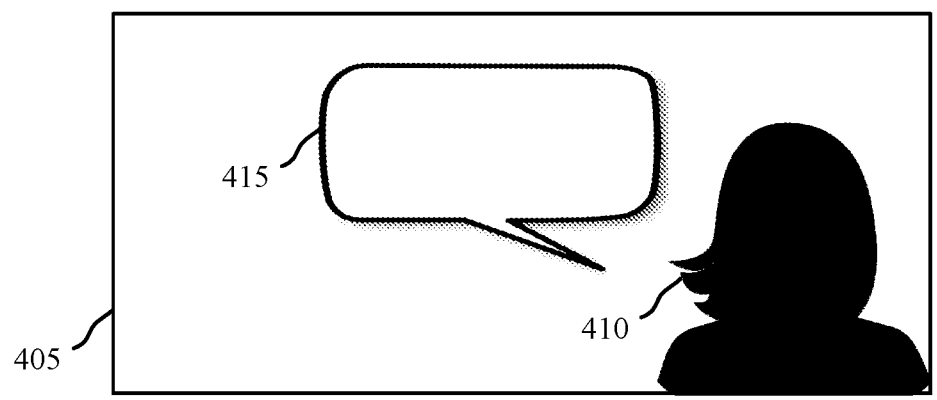
FIG. 4B shows an example perspective view of a video call related to an automation and/or security system in accordance with various aspects of this disclosure.
Figure 4C:
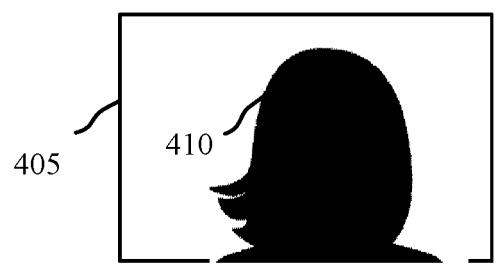
FIG. 4C shows an example perspective view of a video call related to an automation and/or security system in accordance with various aspects of this disclosure.

FIGS. 4A, 4B, and 4C show three respective perspective views of an example video call related to an automation and/or security system in accordance various aspects of this disclosure.

In one embodiment, FIG. 4A shows an example display frame 405 of a video call in accordance with various aspects of this disclosure. In this embodiment, the system has detected the presence of person 410 in a location. For purposes of discussion, the location is a living room. At this point, person 410 has not begun speaking, and thus identification of person 410 may have been by motion detection, thermal detection, an RFID tag, detection of vibration (e.g., walking, breathing), detection of footfall sounds, detecting the sound of setting down an object, some combination, and/or other things. In addition, the identity of person 410 may be determined and identified at this point. Person 410 may be identified by way of facial recognition, body size and shape recognition, identification of an associated portable electronic device (e.g., smartphone) or RFID tag, fingerprint recognition at a sensor located near the entrance to the room, retinal identification, some combination, and/or other factors and/or methods.

Person 410 is not centered in the display frame 405. In one embodiment, the system may be waiting to see if other people will be joining the video call. In another embodiment, user preferences may be established which instruct the camera to keep a wide field of view. In some embodiments, this instruction regarding the field of view may relate to a predetermined time, a predetermined picture setting, an elapsed amount of time, a lighting condition (e.g., whether the person is backlit or dark, whether a section within a wide field of view is back lit or dark), some combination, and/or other settings. Although the field of view has not changed, the camera may make adjustments to the video by adjusting a focus, a metering, a brightness, a saturation, a contrast, one or more highlights, one or more shadows, aperture and/or f-stop settings, a vibration sensitivity, some combination, and/or other settings.

In FIG. 4B, person 410 begins speaking and the audible sound 415 is detected by the system based on one or more inputs received by a microphone and/or video recording device, among others. At this point, person 410 is still located to the right of center in the display frame 405. However, now that person 410 has begun speaking, the camera may receive instructions to adjust the display (i.e., in real-time or based on pre-determined preferences and instructions) and/or itself initiate an adjustment of the display. In some embodiments, the resolution, frame rate, white balance, gain, sensitivity (e.g., ISO), focus, metering, brightness, saturation, contrast, highlights, shadows, aperture and f-stop settings, and/or vibration sensitivity and the like may be adjusted, among other features.

In FIG. 4C, the camera may receive instructions (i.e., in real-time or based on pre-determined preferences and instructions) to adjust the display in such a way that the person 410 is centered in the middle of the display frame 405, vertically, horizontally, and/or both. In addition, the camera may adjust the zoom level so that the image of the person 410 (or some portion of the person, such as her face) fills a larger area of the display frame 405.

The zoom level may be adjusted by way of optical and/or digital zoom methods. In some embodiments, digital zoom is enabled by a processor coupled to a device (e.g., such as a camera or video camera). In using a digital zoom, a portion of the image data may be electronically scaled using interpolation algorithms. In some embodiments, the scaling may be done so as to maintain the same aspect ratio and pixel dimensions as the original image.

Thus, as shown in example FIG. 4C, the camera may zoom in on person 410 by scaling the portion of the original image in a way such that person 410 now occupies a larger portion of the center of the display frame 405.

Figure 5A:
FIG. 5A shows an example perspective view of a video call related to an automation and/or security system in accordance with various aspects of this disclosure.
Figure 5B:
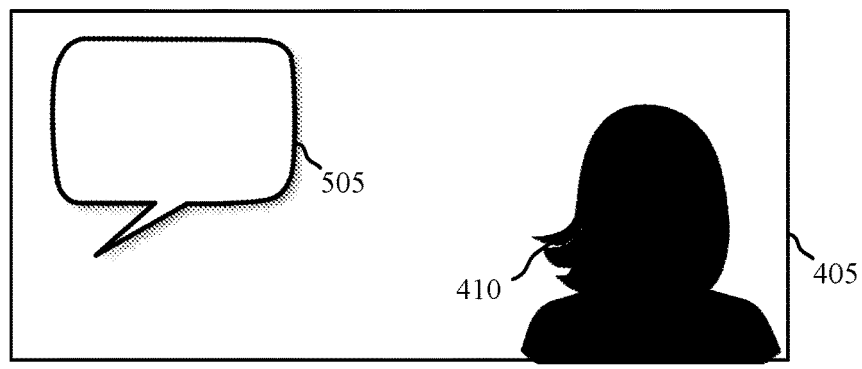
FIG. 5B shows an example perspective view of a video call related to an automation and/or security system in accordance with various aspects of this disclosure.

FIGS. 5A, 5B, 5C, and 5D show four respective perspective views of an example video call related to an automation and/or security system in accordance with various aspects of this disclosure. In one embodiment, FIG. 5A may pick up from where FIG. 4C left off; in other words, person 410 is speaking and the image of person 410 occupies a predetermined section of the display frame. In FIG. 5B, the display frame 405 still has person 410 in the frame (e.g., perhaps person 410 is still speaking, or has paused speaking, or there is a user preference indicating person 410 should remain in frame); however, the system now identifies audible sound 505. For example, the decibel level in the room may change, a change in frequency and/or pitch may be detected, vibrational changes may be detected, the location from which the sound is detected may change (e.g., by way of a multi-directional microphone and/or by a plurality of microphones). In some embodiments, the camera and the sound detection may be part of the same device. In other embodiments, the sound detection may be made by a different device and/or sensor communicatively coupled to the camera and/or to other components of the system.

In one embodiment, audible sound 505 may be another person speaking and/or the audible sound 505 may be the sound of someone entering the room or otherwise joining in on the conversation. Thus, the system may adjust the display frame 405 to include more of the room than shown in FIG. 5A.

Figure 5C:
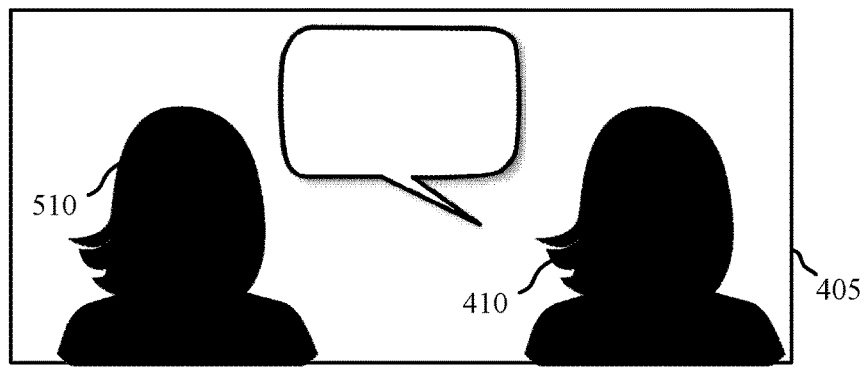
FIG. 5C shows an example perspective view of a video call related to an automation and/or security system in accordance with various aspects of this disclosure.

In FIG. 5C, the camera has received instructions to zoom out, thus including both person 410 and person 510 in the display frame 405. In this embodiment, both people may be speaking, and thus they share space in the display frame.

Figure 5D:
FIG. 5D shows an example perspective view of a video call related to an automation and/or security system in accordance with various aspects of this disclosure.

In FIG. 5D, the camera has panned over to person 510 and zoomed in on person 510 alone. In this embodiment, person 510 may now be the only person speaking, and the system has adjusted accordingly. In other embodiments, the camera may have adjusted the settings based on user preferences (e.g., always keep the camera on person 510 if person 510 is in the room, etc.). User preferences may include: time of day, day of the week, day of the year, specific actions for specific people, specific actions for each camera in a particular room, keywords identified, hand signals identified, specific sounds identified (e.g., a firm alarm, a doorbell, a phone ringing), etc.

Figure 6A:
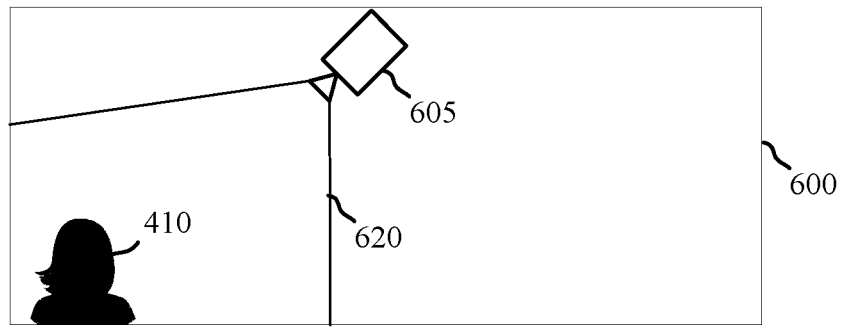
FIG. 6A shows an example overhead view of a video call related to an automation and/or security system in accordance with various aspects of this disclosure.
Figure 6B:
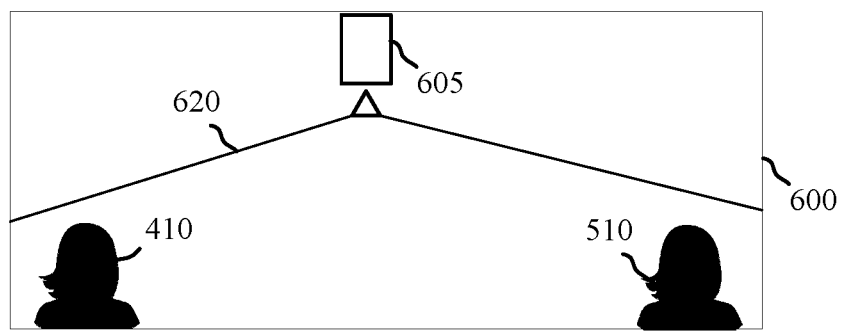
FIG. 6B shows an example overhead view of a video call related to an automation and/or security system in accordance with various aspects of this disclosure.
Figure 6C:
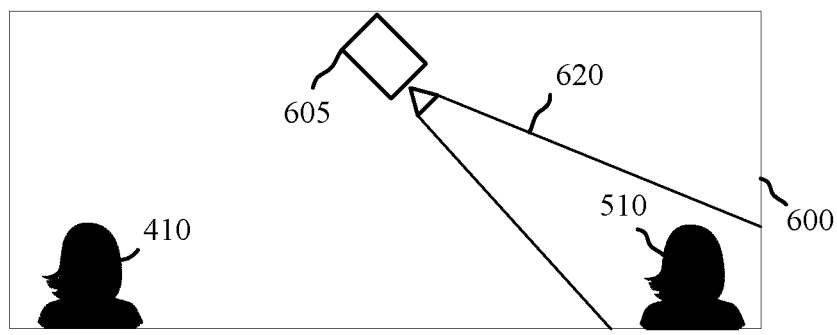
FIG. 6C shows an example overhead view of a video call related to an automation and/or security system in accordance with various aspects of this disclosure.

FIGS. 6A, 6B, and 6C show three respective overhead views of an example video call related to an automation and/or security system in accordance with various aspects of this disclosure. FIG. 6A may correspond to the example embodiment shown in FIG. 4A, among others. Room 600 is shown in overhead view, with person 410 located in the far left corner of the room (away from camera 605). It may be determined that person 410 is speaking, or that the camera should otherwise be focused on person 410. Thus, the camera is adjusted to point toward person 410 and include person 410 in the field of view 620. Person 410 may be located within the field of view 620 based on camera adjustments such as panning, tilting, zooming, and other adjustments previously discussed.

FIG. 6B may correspond to the example embodiment shown in FIG. 5C, among others. Room 600 is shown in overhead view, with person 410 located in the far left corner of the room and person 510 located in the far right corner of the room. It may be determined that the camera should include both person 410 and person 510 within field of view 620, and thus the camera may zoom out so as to include an image of both people. Other adjustments, as previously discussed and/or in addition to those discussed, may be made as well.

FIG. 6C may correspond to the example embodiment shown in FIG. 5D, among others. Room 600 is shown in overhead view, with person 410 located in the far left corner of the room and person 510 located in the far right corner of the room. It may be determined that the camera should only include person 510, and thus camera adjustments are made to include only person 510 within field of view 620, and thus the camera may zoom in, pan, and/or tilt, among other functions, to include an image of only person 510. Other adjustments, as previously discussed and/or in addition to those discussed, may be made as well.

In some embodiments, person 410 and person 510 may remain in one location within the room; however, in other embodiments, person 410 and/or person 510 may move around the room (e.g., stand up, walk, roll a chair to another location, etc.). In this embodiment, the movements of the people may be tracked and the video adjusted accordingly. In some examples, tracking movement may be based on user preferences.

In some embodiments, person 410 and person 510 may be participating the same conference call, but may be located in different rooms and/or different locations within one or more rooms and/or areas. For example, person 410 may be located in room 600 which may be a living room, whereas person 510 may be located in a kitchen. The embodiments previously discussed may be equally applicable if the two people are located in two different locations and/or areas, among other variations. In one embodiment, if person 410 is speaking, instead of the camera simply panning to person 410, the system may receive instructions to display the image from the camera located in the room with person 410. When person 510 speaks, the system may switch the display to show the image taken by the camera located in the room with 510. In another embodiment, a person may move from room to room, and each camera associated with each respective room may pick up the audio and/or video associated with the person, and consequently capture, record, and/or transmit the audio and/or video to the conference call or store the audio and/or video in memory.

Figure 7:
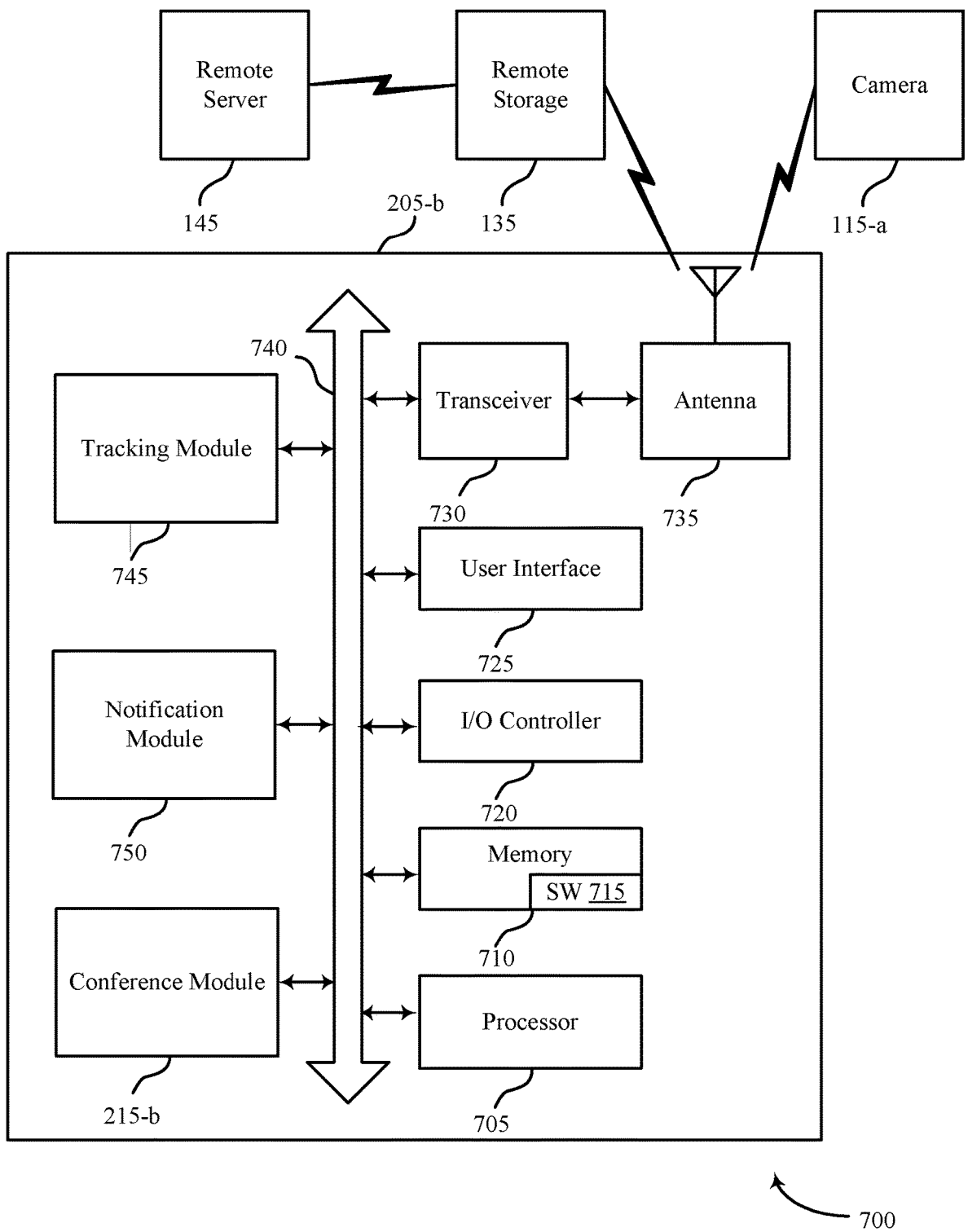
FIG. 7 shows a computer system in accordance with various aspects of this disclosure.

FIG. 7 shows a system 700 for use in automation and/or security systems in accordance with various aspects of this disclosure. System 700 may include an apparatus 205-b, which may be an example of the control panels 105 of FIG. 1 and/or another device. Apparatus 205-b may also be an example of one or more aspects of apparatus 205 of FIGS. 2 and 3 and/or device 115 of FIG. 1, such as a camera. In other embodiments, apparatus 205-b may also be an example of camera 605 of FIG. 6. In some embodiments, the terms a control panel and a control device are used synonymously.

Apparatus 205-b may also include components for bi-directional voice and data communications including components for transmitting communications and components for receiving communications. For example, apparatus 205-b may communicate bi-directionally with one or more of device 115-a, remote storage 135, and/or remote server 145. This bi-directional communication may be direct (e.g., apparatus 205-b communicating directly with remote storage 135) or indirect (e.g., apparatus 205-b communicating indirectly with remote server 145 through remote storage 135).

In some embodiments, apparatus 205-b may comprise tracking module 745. Tracking module may be enabled to track the movements of a person in a location before and/or during a video call. In some examples, tracking module may be enabled to detect a change in location, a change in motion, a change in sound (e.g., origination of the sound, Doppler effect, etc.), identification of an RFID tag located in a different location in the room and/or in the building, biometric identification, crossing over a geo-fence, etc.

Apparatus 205-b may also include a processor 705, and memory 710 (including software (SW) 715), an input/output controller 720, a user interface 725, a transceiver 730, and one or more antennas 735 each of which may communicate—directly or indirectly—with one another (e.g., via one or more buses 740). The transceiver 730 may communicate bi-directionally—via the one or more antennas 735, wired links, and/or wireless links—with one or more networks or remote devices as described above.

For example, the transceiver 730 may communicate bi-directionally with one or more of device 115-a, remote storage 135, and/or remote server 145. The transceiver 730 may include a modem to modulate the packets and provide the modulated packets to the one or more antennas 735 for transmission, and to demodulate packets received from the one or more antennas 735. While a control panel or a control device (e.g., 205-b) may include a single antenna 735, the control panel or the control device may also have multiple antennas 735 capable of concurrently transmitting or receiving multiple wired and/or wireless transmissions. In some embodiments, one element of apparatus 205-b (e.g., one or more antennas 735, transceiver 730, etc.) may provide a direct connection to a remote server 145 via a direct network link to the Internet via a POP (point of presence). In some embodiments, one element of apparatus 205-b (e.g., one or more antennas 735, transceiver 730, etc.) may provide a connection using wireless techniques, including digital cellular telephone connection, Cellular Digital Packet Data (CDPD) connection, digital satellite data connection, and/or another connection.

The signals associated with system 700 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 735 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 735 may receive signals or information specific and/or exclusive to itself. In other embodiments, each antenna 735 may receive signals or information not specific or exclusive to itself.

In some embodiments, one or more sensors (e.g., motion, proximity sensor, smoke, glass break, door, window, carbon monoxide, heat, sound, and/or another sensor) may connect to some element of system 700 via a network using one or more wired and/or wireless connections. These one or more sensors may provide input related to the systems and methods described here, including the sub-modules discussed for conference module 215-a.

In some embodiments, the user interface 725 may include an audio device, such as an external speaker system, a microphone, an external display device such as a display screen, and/or an input device (e.g., remote control device interfaced with the user interface 725 directly and/or through I/O controller 720).

One or more buses 740 may allow data communication between one or more elements of apparatus 205-b (e.g., processor 705, memory 710, I/O controller 720, user interface 725, etc.).

The memory 710 may include random access memory (RAM), read only memory (ROM), flash RAM, and/or other types. The memory 710 may store computer-readable, computer-executable software/firmware code 715 including instructions that, when executed, cause the processor 705 to perform various functions described in this disclosure. Alternatively, the computer-executable software/firmware code 715 may not be directly executable by the processor 705 but may cause a computer (e.g., when compiled and executed) to perform functions described herein. Alternatively, the computer-readable, computer-executable software/firmware code 715 may not be directly executable by the processor 705 but may be configured to cause a computer (e.g., when compiled and executed) to perform functions described herein. The processor 705 may include an intelligent hardware device, e.g., a central processing unit (CPU), a microcontroller, an application-specific integrated circuit (ASIC), etc.

In some embodiments, the processor 705 may include, among other things, an intelligent hardware device (e.g., a central processing unit (CPU), a microcontroller, and/or an ASIC, etc.). The memory 710 may contain, among other things, the Basic Input-Output system (BIOS) which may control basic hardware and/or software operation such as the interaction with peripheral components or devices. For example, the conference module 215-b and/or the tracking module 745 may be stored within the memory 710. Applications resident with system 700 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 730, one or more antennas 735, etc.).

Many other devices and/or subsystems may be connected to one or may be included as one or more elements of system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems can be interconnected in different ways from that shown in FIG. 7. In some embodiments, an aspect of some operation of a system, such as that shown in FIG. 7, may be readily known in the art and are not discussed in detail in this application. Code to implement the present disclosure can be stored in a non-transitory computer-readable medium such as one or more of memory 710 or other memory. The operating system provided on I/O controller 720 may be iOS®, ANDROID®, MS-DOS®, MS-WINDOWS®, OS/2®, UNIX®, LINUX®, or another known operating system.

The transceiver 730 may include a modem configured to modulate the packets and provide the modulated packets to the antennas 735 for transmission and/or to demodulate packets received from the antennas 735. While the apparatus 205-b may include a single antenna 735, the apparatus 205-b may have multiple antennas 735 capable of concurrently transmitting and/or receiving multiple wireless transmissions.

Figure 8:
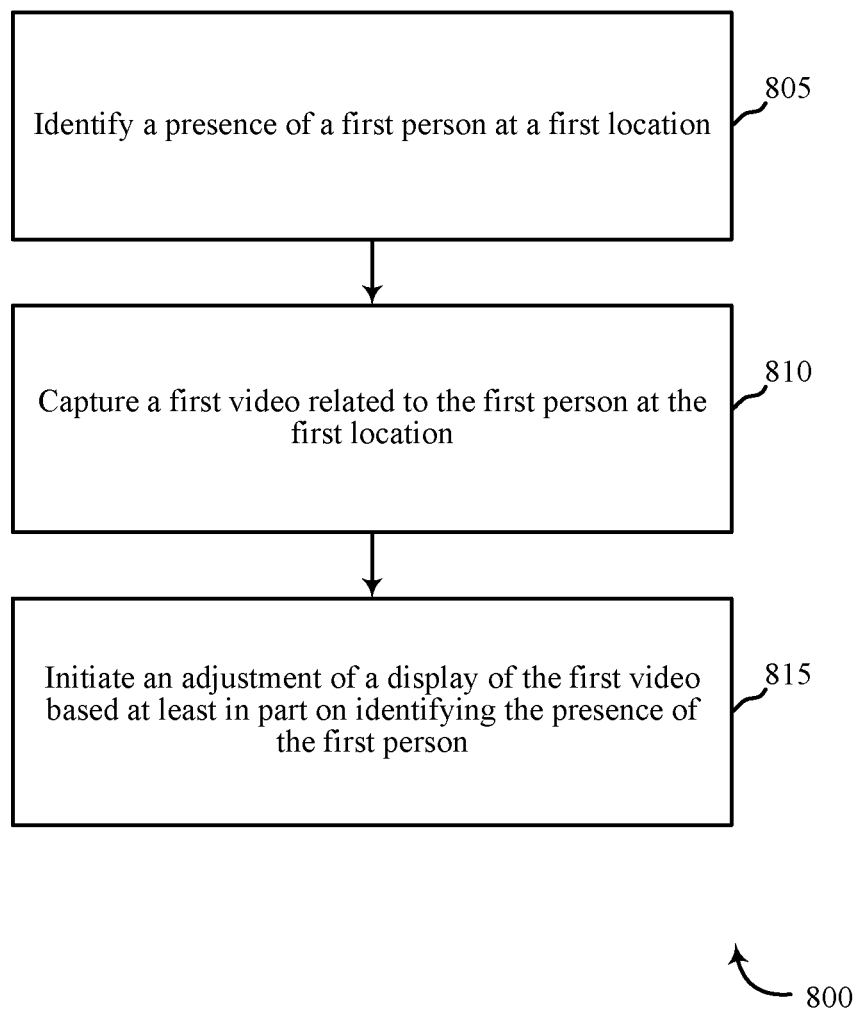
FIG. 8 shows a flow chart illustrating an example of a method for a automation and/or security system in accordance with various aspects of this disclosure.

FIG. 8 is a flow chart illustrating an example of a method 800 for an automation and/or security system in accordance with various aspects of this disclosure. For clarity, the method 800 is described below with reference to aspects of one or more of the elements and features described with reference to FIGS. 1 through 7, among others. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operations of method 800 may be performed using the conference module 215 described with reference to FIGS. 2 and/or 3, among others.

At block 805, the presence of a first person located at a first location is identified. The camera, such as the audio/visual device previously described, may be configured to capture images, videos and/or audio of a room. A person may be identified based at least in part on image analysis of one or more parameters. Image analysis may be used to detect at least one of edge, corner, interest point, blob, ridge, shape, color, texture, material, and/or reflectivity in relation to the person, among other things. In other embodiments, the presence of a person may be detected by biometric means such as by audio detection, sub-audio detection (e.g., vibrations), infrared detection, thermal detection, and the like. The location of the person may be determined by way of triangulation, GPS tracking (e.g., by detecting the presence of a portable electronic device associated with a person), receiving information from a sensor located on the person or in the room, detection of the location of sound and/or movement, etc.

At block 810, a first video is captured related to the first person at the first location. Once a person is identified as being within the possible field of view of the camera, the camera may begin recording a video. In some embodiments, the camera may begin recording before the presence of a person is detected. In other embodiments, the camera may begin recording upon detecting the presence of a person in the room, but before the person begins making noise and/or is identified. In yet another embodiment, the camera may begin recording upon detecting the person has begun making noise (e.g., speaking, singing). The video captured may include still images, moving images, and/or an audio feed, among other things. Other information may be captured, identified, and/or determined such as the specific identity of the person, the amount of time the person has been speaking, the amount of time the person spends in the field of view, some combination, and/or other information.

At block 815, an adjustment of a display of the first video is initiated based at least in part on identifying the presence of the first person. The display may be adjusted in one or more ways; for example, the zoom level may be adjusted to capture more or less of the person speaking and/or other people in the location. In other embodiments, the resolution, frame rate, white balance, gain, sensitivity (e.g., ISO), focus, metering, brightness, saturation, contrast, highlights, shadows, aperture and f-stop settings, and vibration adjustments may be adjusted, among other features and/or settings. In yet other embodiments, the pan and tilt of the camera may additionally and/or alternatively be adjusted.

Thus, the method 800 may provide video conferencing in accordance with at least some of the embodiment discussed above. It should be noted that the method 800 is just one implementation and that the operations of the method 800 may be rearranged or otherwise modified such that other implementations are possible.

Figure 9:
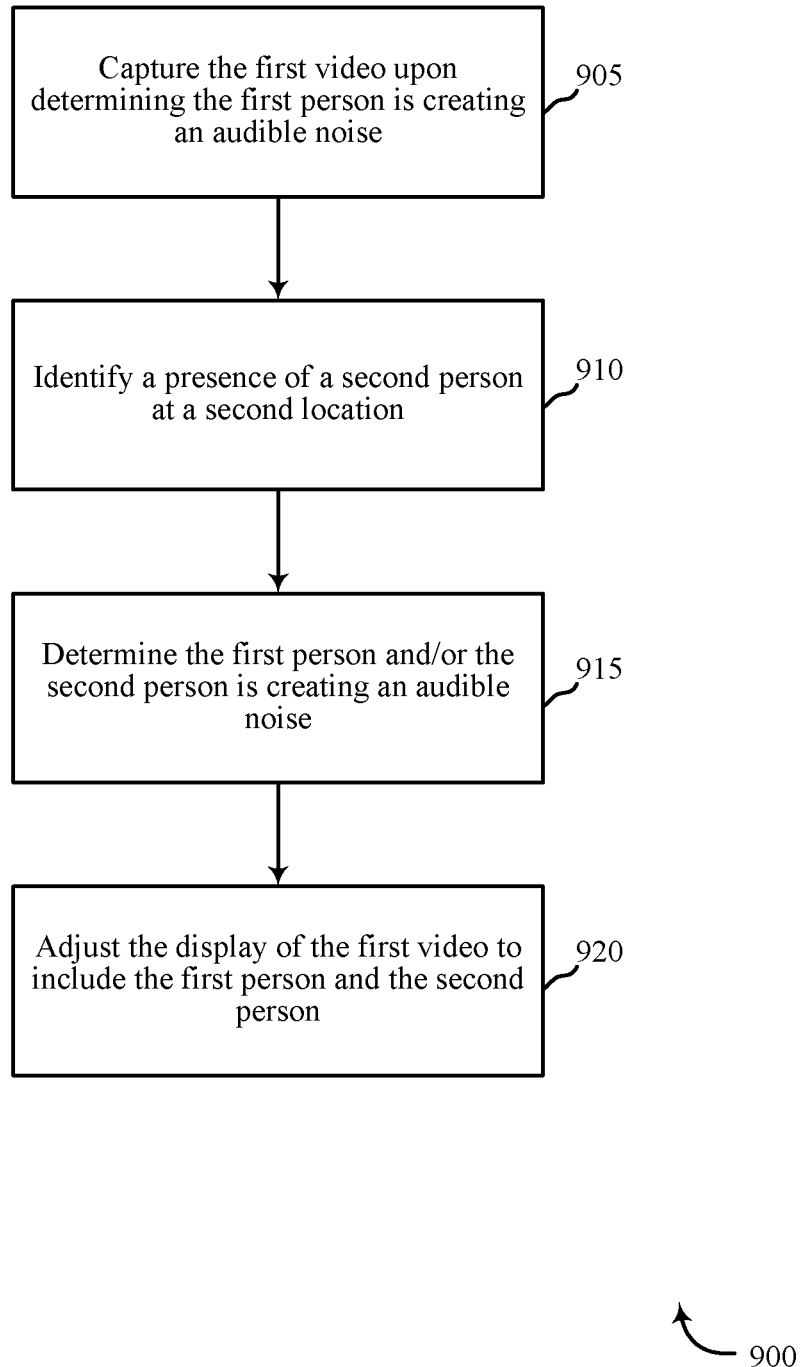
FIG. 9 shows a flow chart illustrating an example of a method for a automation and/or security system in accordance with various aspects of this disclosure.

FIG. 9 is a flow chart illustrating an example of a method 900 for an automation and/or security system in accordance with various aspects of this disclosure. For clarity, the method 900 is described below with reference to aspects of one or more of the elements and features described with reference to FIGS. 1 through 7, among others. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operations of method 900 may be performed using the conference module 215 described with reference to FIGS. 2 and/or 3, among others.

At block 905, the first video may be captured upon determining the first person is making an audible noise. In some embodiments, the determination is made that the first person is speaking, singing, crying, yelling, laughing, some combination, and/or other actions. The camera may detect the audible noise by way of a microphone or other sensor coupled to and/or in communication with the camera and/or another system component and/or element.

At block 910, the presence of a second person at a second location is determined. In one embodiment, the second location may be a location in the same room as the first location; for example, two people sitting in different locations around a kitchen table or two people sitting in different locations in a living room. In other embodiments, the system may include multiple cameras in multiple locations, rooms, and/or areas, and may be enabled to combine the two video streams into one call. For example, a person may be detected by a first camera in the living room and a second person may be detected by a second camera located in the kitchen, where both cameras are capturing audio and/or video for a single call.

At block 915, one or both of the first and/or second people are determined to be creating audible noises. In one embodiment, both people may be located in the same room and are speaking at the same time and/or are speaking one after the other. In this example, a single camera and associated system elements (e.g., microphone, sensors, etc.) may detect, analyze, and process the sound and the videos made by one or both of the people. In another embodiment, each person may be located in separate rooms and each respective camera and associated system elements may detect each respective person is making noise.

At block 920, the display of the first video may be adjusted to include the first and the second person. In one embodiment, if it is detected the first person is speaking, the first video may include both the first person and the second person. In another embodiment, if it is detected that the first person and the second person both speak during a pre-determined time duration (e.g. two seconds pass between the first and second person speaking), the video may be adjusted to include both the first and the second person. In such an embodiment, determining that both people are speaking within a pre-determined time duration may indicate both parties are sharing equal speaking time during the conference (e.g., co-presenters), and thus having both on screen is desired.

Thus, the method 900 may provide video conferencing in accordance with at least some of the embodiments discussed above. It should be noted that the method 900 is just one implementation and that the operations of the method 900 may be rearranged or otherwise modified such that other implementations are possible.

In some examples, aspects from the methods 800 and 900 may be combined and/or separated. It should be noted that the methods 800 and 900 are just example implementations, and that the operations of the methods 800 and 900 may be rearranged or otherwise modified such that other implementations are possible.

In some embodiments, the methods, systems, and techniques may be used for package detection.

Figure 10:
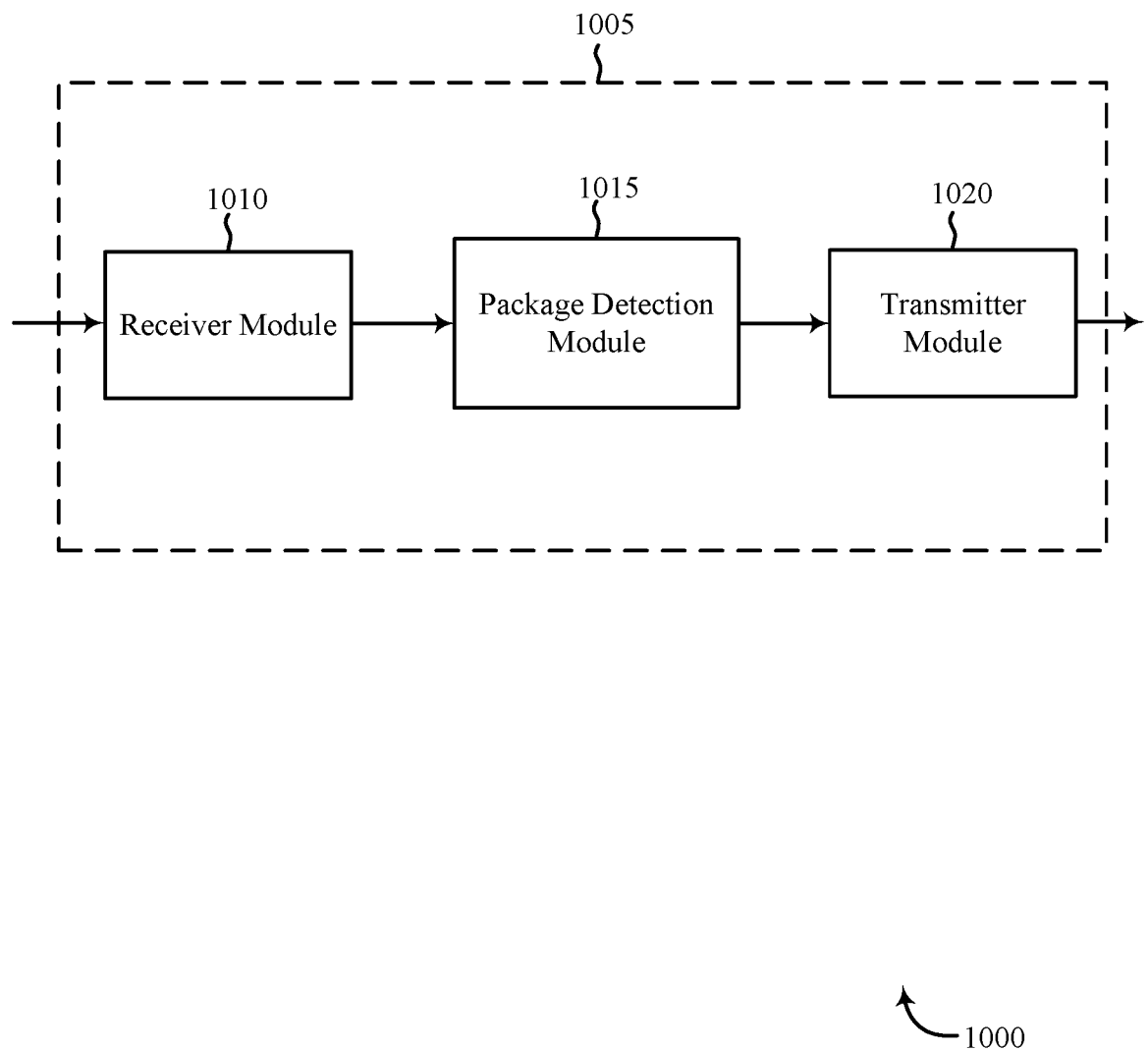
FIG. 10 shows a block diagram of a device relating to an automation and/or security system in accordance with various aspects of this disclosure.

FIG. 10 shows a block diagram 1000 of an apparatus 1005 for use in electronic communication, in accordance with various aspects of this disclosure. In one embodiment, the apparatus 1005 may be an example of one or more aspects of a control panel 105 and/or an indoor camera (e.g., device 115) described with reference to FIG. 1, among others. In some embodiments, apparatus 1005 may be an example of a security camera such as a doorbell camera, as illustrated by device 115.

The apparatus 1005 may include a receiver module 1010, a package detection module 1015, and/or a transmitter module 1020. The apparatus 1005 may also be or include a processor. Each of these modules may be in communication with each other—directly and/or indirectly.

The components of the apparatus 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 1010 may receive information such as packets, user data, and/or control information associated with various information channels (e.g., control channels, data channels, etc.). The receiver module 1010 may be configured to receive data and/or control information from another device such as a control panel, sensor, and/or a camera. Information may be passed on to the package detection module 1015, and to other components of the apparatus 1005.

Package detection module 1015 enables a method for package detection in conjunction with a security and/or automation system. Upon receiving one or more images and/or videos at the receiver module 1010, package detection module 1015 performs image analysis based at least in part on the one or more images and/or videos to detect a package and/or other feature. Upon detecting a package and/or other feature, the package detection module 1015 monitors the package and determines whether a person that is delivering, moving, and/or removing the detected package is authorized to do so. The apparatus 1005 may perform various functions based on this analysis and/or determination.

The transmitter module 1020 may transmit the one or more signals received from other components of the apparatus 1005. The transmitter module 1020 may transmit data and/or controls signals to a control panel and/or sensor associated with the security and/or automation system. The data and/or control signals transmitted by the transmitter module 1020 may be associated with the image/video analysis and package/feature detection performed by the package detection module 1015. In some examples, the transmitter module 1020 may be co-located with the receiver module 1010 in a transceiver module.

Figure 11:
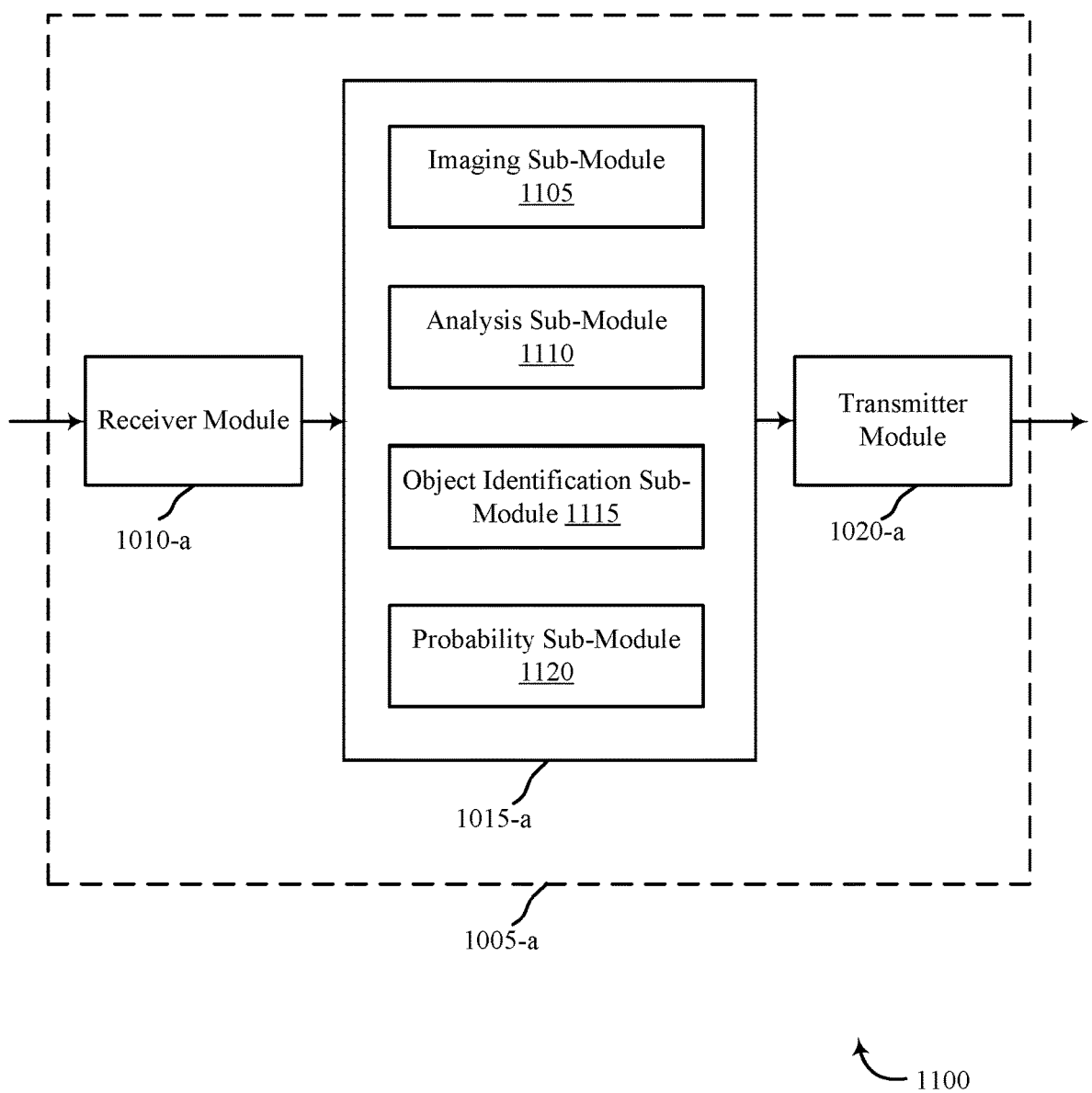
FIG. 11 shows a block diagram of a device relating to a security and/or an automation system, in accordance with various aspects of this disclosure.

FIG. 11 shows a block diagram 1000 of an apparatus 1005-a for use in wireless communication, in accordance with various aspects of this disclosure. The apparatus 1005-a may be an example of one or more aspects of a control panel 105 and/or a device 115 described with reference to FIG. 1, among others. It may also be an example of an apparatus 1005 described with reference to FIG. 10. The apparatus 1005-a may include a receiver module 1010-a, a package detection module 1015-a, and/or a transmitter module 1020-a, which may be examples of the corresponding modules of apparatus 1005. The apparatus 1005-a may also include a processor. Each of these components may be in communication with each other. The package detection module 1015-a may include imaging sub-module 1105, analysis sub-module 1110, object identification sub-module 1115, and probability sub-module 1120. The receiver module 1010-a and the transmitter module 1020-a may perform the functions of the receiver module 1010 and the transmitter module 1020, of FIG. 10, respectively.

In one embodiment, imaging sub-module 1105 may identify image data from a signal. The image data may include at least one of photo data and video data. In some cases, the image data may include data captured within an electromagnetic spectrum such as the visual spectrum, infrared spectrum, etc. For example, imaging sub-module 1105 may capture real-time views from a camera sensor of a camera and capture image data from the captured images. For example, the imaging sub-module 1105 may capture images from a security camera such as a doorbell camera or other type of camera located at a home, an office, and/or other type of building.

In one embodiment, analysis sub-module 1110 may analyze the image data based at least in part on a first parameter. The first parameter may include image analysis data to detect at least one of shape, color, texture, material, and/or reflectivity of the image data, among other things. For example, analysis sub-module 1110 may perform image analysis on the image data to detect distinguishable features. In some cases, analysis sub-module 1110 may examine one or more pixels of an image to determine whether the one or more pixels includes a feature of interest. In some embodiments, analysis sub-module 1110 may detect a face, head, torso, arms, and/or legs of a user in an image. In some embodiments, analysis sub-module 1110 may detect features of the user's head and/or face. In some embodiments, analysis sub-module 1110 may detect an edge, corner, interest point, blob, and/or ridge in a captured image. An edge may be points of an image where there is a boundary (or an edge) between two image regions, or a set of points in the image which have a relatively strong gradient magnitude. Corners and interest points may be used interchangeably. For example, analysis sub-module 1110 may detect an edge and/or corner of a box or package. The box or package may be detected on a surface or being carried by a person such as a delivery person. An interest point may refer to a point-like feature in an image, which has a local two dimensional structure. In some embodiments, the analysis sub-module 1110 may search for relatively high levels of curvature in an image gradient to detect an interest point and/or corner (e.g., corner of an eye, corner of a mouth). Thus, the analysis sub-module 1110 may detect in an image of a user's face the corners of the eyes, eye centers, pupils, eye brows, point of the nose, nostrils, corners of the mouth, lips, center of the mouth, chin, ears, forehead, cheeks, and the like. A blob may include a complementary description of image structures in terms of regions, as opposed to corners that may be point-like in comparison. Thus, in some embodiments, the analysis sub-module 1110 may detect a smooth, non-point-like area (i.e., blob) in an image.

Additionally, or alternatively, in some embodiments, the analysis sub-module 1110 may detect a ridge of points in the image. In some embodiments, the analysis sub-module 1110 may extract a local image patch around a detected feature in order to track the feature in other images such as previously and/or subsequently captured images. Accordingly, the first parameter may include at least one of edge, corner, interest point, blob, ridge, shape, color, texture, material, and/or reflectivity of the image data. In some cases, the first parameter may include a logo, icon, and/or symbol. For example, in some embodiments, analysis sub-module 1110 may detect a logo of a shipping company. In some cases, analysis sub-module 1110 may detect a shape such as a logo on a surface of a box or package. Additionally, or alternatively, analysis sub-module 1110 may detect a logo on a uniform.

In one example, analysis sub-module 1110 may detect a UPS® logo on the surface of a package left on a porch, a logo on a uniform of a UPS® delivery person, and/or a logo on a UPS® delivery truck. This detection and related analysis may be performed based at least in part on a communication referencing a remote source having a repository of information such as shapes, logos, colors, tracking numbers, QR codes, bar codes, etc. In some cases, analysis sub-module 1110 may analyze the image data based at least in part on a second parameter. Thus, as one example, analysis sub-module 1110 may analyze a detected feature associated with a delivery person, uniform or truck as a first parameter (e.g., facial recognition, logo, etc.), and may analyze a detected feature associated with a package as a second parameter (e.g., edge, corner, color, shape, size, logo, etc.). In one embodiment, analysis sub-module 1110 may analyze at least one subset of the image data.

In some cases, object identification sub-module 1115 may identify a presence of an object based at least in part on the analyzing a captured image to identify image data. For example, based on the detection of an edge, corner, shape, size, and/or logo in a captured image, for example, object identification sub-module 1115 may identify the presence of a certain object such as a box or package, a delivery person, and/or a delivery truck. Accordingly, in some cases, the image data may include motion detection data based at least in part on a motion of the detected object, and/or the image data may include facial recognition data. In some cases, the image data may include a first set of image data and a second set of image data. The second set of image data may be visual data captured and/or detected after the first set of image data is captured and/or detected. Alternatively, the second set of image data may be visual data captured and/or detected as a subset of a first set of image data.

In some embodiments, analysis sub-module 1110 may compare at least a portion of an earlier set of image data with at least a portion of a later set of image data. For example, in conjunction with a package delivery, analysis sub-module 1110 may compare an image of an area of a patio before a package is placed within the area and after the package is placed within the area. Similar for a package pickup, analysis sub-module 1110 may compare an image of an area of a patio before the package, placed in the area of the patio, is retrieved and after the package is retrieved. In some cases, analysis sub-module 1110 may query an online database to verify a time of delivery and/or pickup. For example, package detection module 1015 may be configured to expect a package delivery and/or package pickup. Accordingly, analysis sub-module 1110 may query an online database associated with a delivery service such UPS®, FEDEX®, DHL®, a user's email, etc. Thus, upon detecting a package delivery and/or pickup, analysis sub-module 1110 may query the online database to determine the status of the delivery or pickup. As one example, analysis sub-module 1110 may query the database and determine that the delivery time of a package is at 3:00 P. M. The analysis sub-module 1110 may then determine that the analysis of the image data indicates that a package was detected within a predetermined range of the delivery time indicated by the online database (e.g., within 5 minutes). Accordingly, analysis sub-module 1110 may confirm that the detected package is associated with the expected delivery.

In one embodiment, package detection module 1015 may be configured to use at least some of the aspects and/or elements describes with relation to the digital zoom conference methods and systems. For example, in one embodiment, the package detection module 1015 may be enabled to capture images by receiving user-input to pan, tilt, and/or zoom in on identification information. In other embodiments, the package detection module 1015 may be pre-programmed to zoom in on identifying information.

In another embodiment, the analysis sub-module 1110 may initially identify image data. Based at least in part on the image data identified, a camera may receive instructions to zoom in on a part of the package and send the data to a remote computer system. For example, if a user is waiting for a particular package, and knows the box color is navy blue, the analysis sub-module may identify the image data includes a blue package and may then zoom in on identifying information. Images and image data may be sent to at least one of the people participating of the video conference (e.g., as a picture-in-picture or pop-up window) to show an image of the package.

In one embodiment, probability sub-module 1120 may assess a probability of an object event based at least in part on the identifying a presence of an object. In some cases, probability sub-module 1120 may assess a probability of an object event based on the identifying a presence of an object satisfying a predetermined threshold. In some embodiments, probability sub-module 1120 may assess a first probability of the object event based at least in part on analyzing the image data based at least in part on a first parameter. Additionally, or alternatively, probability sub-module 1120 may assess a second probability of the object event based at least in part on analyzing the image data based at least in part on a second parameter. In one embodiment, probability sub-module 1120 may extract features such as lines, shapes, color segments, OCR texts, deformed parts, etc., from one or more sampled frames (images) from one or more photos and/or video.

Probability sub-module 1120 may make the extract features part of a Bayesian network. Probability sub-module 1120 may then compute, for example, the probability of a person with a package present in an image using a Monte Carlo Markov Chain algorithm (MCMC). Additionally, or alternatively, probability sub-module 1120 may use a Recursive Bayes Filter to combine probabilities from each sample and compute a joint probability, potentially increasing the accuracy of the probability. In some cases, probability sub-module 1120 may incorporate moving patterns in the computation of probability. For example, probability sub-module 1120 may detect movement of a package from one image to the next.

Probability sub-module 1120 may be included in a computing device such as a desktop or laptop, an automation/security control panel, a remote server, and/or a sensor such as a doorbell camera. The probability sub-module 1120 may compute a probability at a sensor, on a computing device, at a control panel, using a network connection, and/or on a remote server. The imaging sub-module 1105 may capture one or more images of an object. The analysis sub-module 1110 may perform image analysis on the one or more captured images, and the object identification sub-module 1115 may identify the object in the one or more captured images. The probability sub-module 1120 may then compute a probability that the identified object is a package for delivery and/or pickup, and/or a person or other identifier associated with a delivery, pickup, and/or event. A processor may execute software code in conjunction with the probability sub-module 1120 to compute a probability that an object in a captured image is a package. A storage medium and/or memory may store the software code.

Factors that may affect the probability include the availability of image analysis data to detect shape, color, texture, material, and/or reflectivity of the image data, among others. In some cases, probability may depend on the ability of the probability sub-module 1120 to detect an edge, corner, interest point, blob, and/or ridge in a captured image. In some embodiments, a user may provide feedback in relation to a probability assessment made by the probability sub-module 1120. The user may indicate whether the probability was accurate or not.

For example, the user may verify that the object identified by the object identification sub-module 1115 and assessed to be a package by the probability sub-module 1120 was indeed a package, a person, etc. The probability sub-module 1120 may use the user's feedback to adjust a calculation of a probability. Accordingly, the probability sub-module 1120 may learn whether its probability is accurate. In some cases, the probability sub-module 1120 may reassess or reanalyze information to update and/or modify a probability and/or assessment that an object event occurred. For example, the probability sub-module 1120 may receive information indicating a delivery confirmation. Accordingly, the probability sub-module 1120 may reassess the probability that the identified object is a package, increasing or decreasing the calculated probability.

Turning again to FIG. 7, apparatus 205-*b* may also include a notification module 750. In one embodiment, notification module 750 may send a notification to a user based at least in part on probability sub-module 1120 assessing a probability of an object event occurring. For example, notification module 750 may send one or more notifications to one or more users based at least in part on whether the assessed probability exceeds a predetermined probability threshold. In some cases, the probability threshold may be determined in relation to sensor calibration, sensor sensitivity, user preference, past probability calculations, probability feedback loops, image quality, system limitations, etc. Upon determining the probability exceeds the predetermined probability threshold, the notification module 750 may generate a notification. In some cases, the notification may include a text message, an email, a computer generated phone call and/or voicemail, and the like. In some cases, notification module 750 may generate a notification in association with an automation/security system. For example, notification module 750 may generate an audio notification such as a chime and/or a computer-generated voice announcement that is played at a control panel and/or using one or more speakers of the automation/security system. In some cases, notification module 750 may generate an alarm upon certain object events being detected. For example, upon the package detection module 1015 detecting a package delivery, notification module 750 may generate an alarm (e.g., via a siren, light, etc.) when the delivered package is detected as being moved or picked up. As one example, package detection module 1015 may determine whether a person approaching a delivered package is known or unknown, authorized or unauthorized, etc. For instance, package detection module 1015 may use facial recognition, voice recognition, pattern detection/learning, device identification (e.g., detecting an identifier associated with a device carried by a user), etc., to determine whether a person approaching a delivered package is known or unknown. Upon determining the person is unknown and detecting the unknown person taking the package, notification module 750 may sound an alarm. Similarly, package detection module 1015 may monitor a package left outside a premises for pickup to determine whether the package is taken by an authorized delivery person or not. A person may be determined to be authorized to interact with the package based on detection of a uniform, delivery truck, company logo, badge or identification, barcode, etc. In some cases, authorization may be determined based on facial recognition, passcode query, and the like. For example, a user approaching the package may be prompted to provide a spoken code or a bade bar code in order to authorize interaction with the package. For example, package detection module 1015 may be configured to detect a specified delivery service for delivery or pickup, such as UPS®, FEDEX®, DHL®, etc. Accordingly, package detection module 1015 may determine whether the person is wearing a uniform of the expected delivery service, whether the delivery truck is from the expected delivery service, etc. Upon determining a package left for pickup is being taken by an unauthorized person, notification module 750 may sound an alarm.

Figure 12:
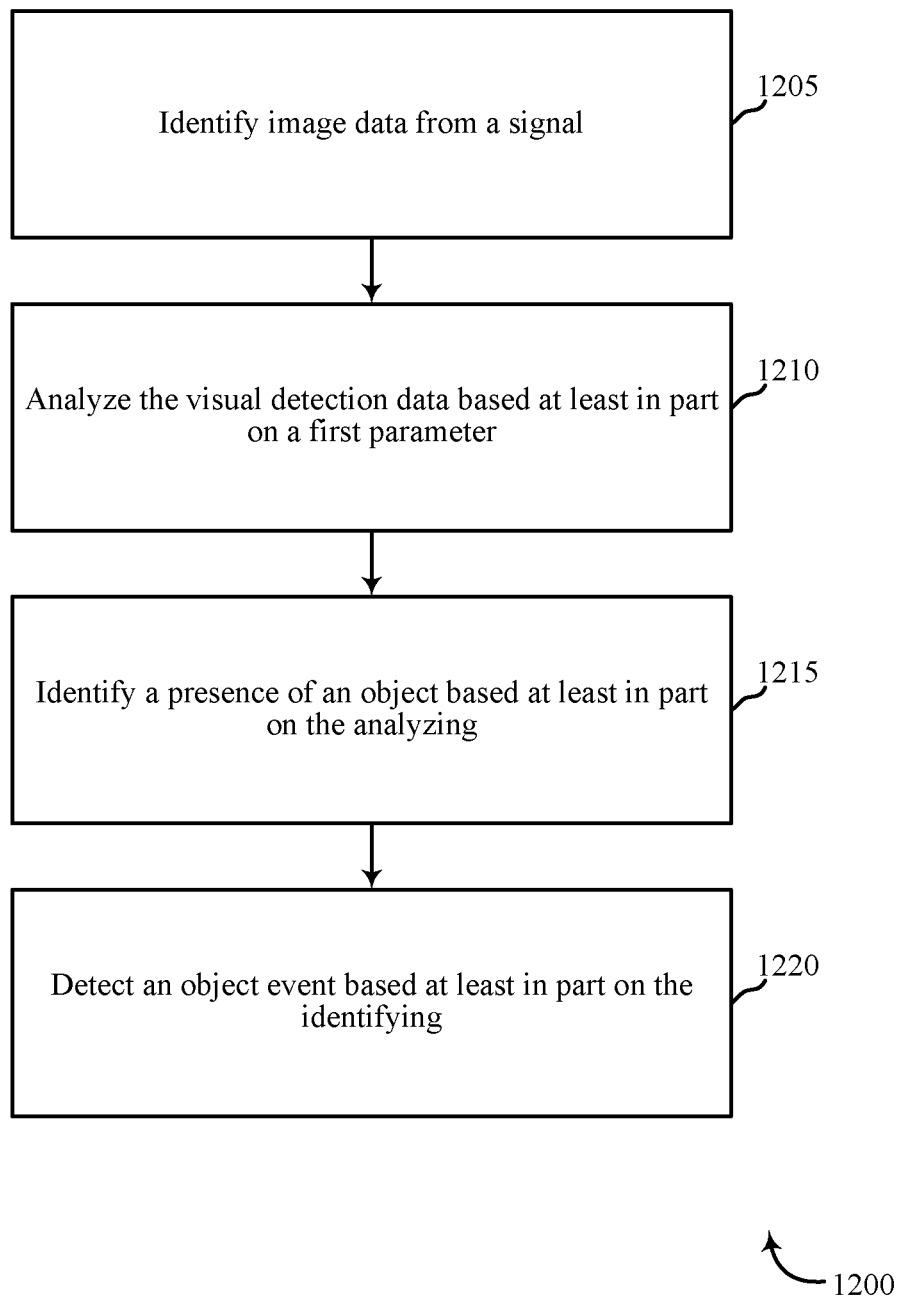
FIG. 12 shows a flow chart illustrating an example of a method for a automation and/or security system in accordance with various aspects of this disclosure.

FIG. 12 is a flow chart illustrating an example of a method 1200 for security and/or an automation system, in accordance with various aspects of this disclosure. For clarity, the method 1200 is described below with reference to aspects of one or more of the elements and features described with reference to FIGS. 1, 10, and/or 11, among others. In some examples, one or more control panels, backend servers, devices, and/or sensors may execute one or more sets of codes to control the functional elements of the control panels, backend servers, devices, and/or sensors to perform the functions described below. Additionally or alternatively, the control panels, backend servers, devices, and/or sensors may perform one or more of the functions described below using special-purpose hardware. The operations of the method 1200 may be performed using the package detection module 1015 described with reference to FIGS. 10-11.

At block 1205, image data may be identified from a signal. The image data may include at least one of photo data and video data, motion detection data based at least in part on a motion of the object, and/or facial recognition data, among other things. At block 1210, the image data may be analyzed based at least in part on a first parameter. The first parameter may include image analysis features (e.g., edge detection, corners, blobs, etc.) to detect at least one of shape, color, texture, material, reflectivity of the image data, etc. In some cases, the analysis may include comparing at least a portion of an earlier set of image data with at least a portion of a later set of image data.

At block 1215, a presence of an object may be identified based at least in part on the analyzing. Presence of an object may be detected by detection of an edge, corner, interest point, blob, ridge, shape, color, texture, material, and/or reflectivity relative to the object, among other things. In some cases, the presence of the object may continue to be monitored to determine whether the object remains at the spot where it was initially detected. The continual monitoring may occur via continuous, intermittent, and/or interval detection of an edge, corner, interest point, blob, ridge, shape, color, texture, material, and/or reflectivity relative to the object. At block 1220, detect an object event based at least in part on the identifying.

Thus, the method 1200 may provide for doorbell camera package detection relating to automation/security systems. It should be noted that the method 1200 is just one implementation and that the operations of the method 1200 may be rearranged or otherwise modified such that other implementations are possible.

Figure 13:
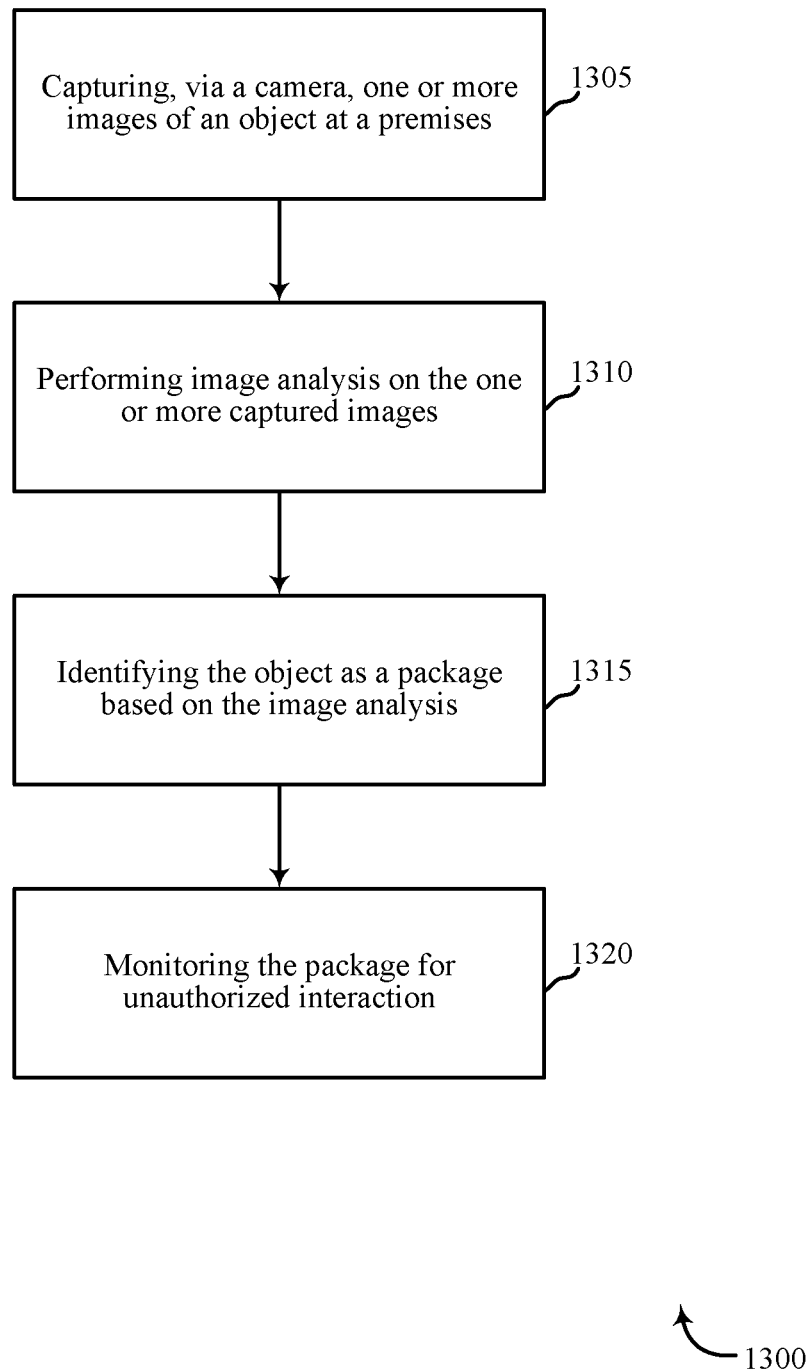
FIG. 13 shows a flow chart illustrating an example of a method for a automation and/or security system in accordance with various aspects of this disclosure.

FIG. 13 is a flow chart illustrating an example of a method 1300 for security and/or an automation system, in accordance with various aspects of this disclosure. For clarity, the method 1300 is described below with reference to aspects of one or more of the elements and features described with reference to FIGS. 1, 10, and/or 11, among others. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operations of block 1305 may be performed using the package detection module 1015 described with reference to FIGS. 10-11.

At block 1305, one or more images of an object at a premises may be captured via a camera. At block 1310, image analysis may be performed on the one or more captured images. In some cases, the analysis may include comparing two or more images captured over a certain time, motion detection, facial recognition, symbol recognition such as detection of a logo of a delivery service, detecting points of interest and tracking them from image to image via cross-correlation, etc. At block 1315, the object may be identified as a package based on the image analysis. The package may be associated with a package delivery or a package pickup.

At block 1320, the package may be monitored for unauthorized interaction. In some cases, further image analysis may be performed to determine whether a person detected as approaching a package scheduled for pickup is an authorized delivery person of the delivery service associated with the scheduled package pickup. In some cases, the monitoring may include identifying a logo on a uniform, an identification badge, a delivery truck, etc. In some cases, the delivery person may display a badge to a camera. For example, upon detecting a person approaching the package, the package detection module 1015 may provide a computer generated or pre-recorded voice prompt that requests the delivery person to display his or her identification card to the camera situated near the package (e.g., a doorbell camera situated at the front door of the premises). In some cases, the package detection module 1015 may query an online database to confirm the tracking status of a package (e.g., "delivered," "delivery pending," "out for delivery," "pickup pending," "picked up," etc.). Upon confirming the package delivery and/or package pickup, the notification module 750 may generate a notification. Likewise, upon detecting unauthorized interaction with the package (e.g., someone taking the package), the notification module 445 may generate a notification and/or sound an alarm.

Thus, the method 1300 may provide for doorbell camera package detection relating to automation/security systems. It should be noted that the method 1300 is just one implementation and that the operations of the method 1300 may be rearranged or otherwise modified such that other implementations are possible.

Figure 14:
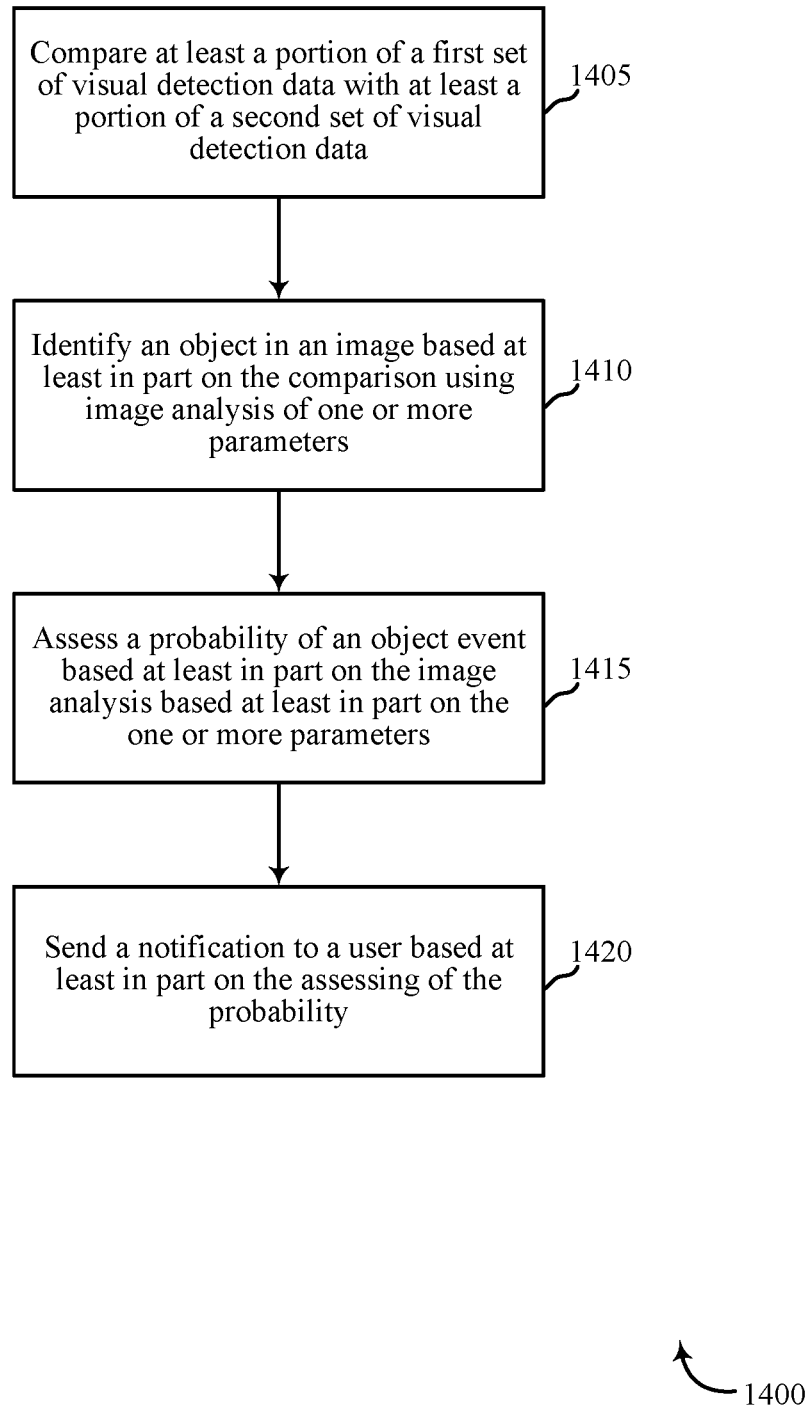
FIG. 14 shows a flow chart illustrating an example of a method for a automation and/or security system in accordance with various aspects of this disclosure.

FIG. 14 is a flow chart illustrating an example of a method 1400 for security and/or an automation system, in accordance with various aspects of this disclosure. For clarity, the method 1400 is described below with reference to aspects of one or more of the elements and features described with reference to FIGS. 1, 10, and/or 11, among others. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operations of block 1405 may be performed using the package detection module 1015 described with reference to FIGS. 10-11.

At block 1405, two or more images and/or videos may be captured of an area of a premises to be used as a first set and a second set of image data. The camera, such as a doorbell camera, may be configured to captured images and/or videos of one or more areas of the premises. At least a portion of a first set of image data may be compared with at least a portion of a second set of image data. In some cases, the first set of image data may have been captured before the second set of image data. For example, an earlier captured image may be compared to a later captured image to detect a change between the captured images. The change may indicate the presence of an object within the view of the doorbell camera. At block 1410, an object may be identified in an image and/or video based at least in part on image analysis of one or more parameters. Image analysis may be used to detect at least one of edge, corner, interest point, blob, ridge, shape, color, texture, material, and/or reflectivity in relation to the identified object, among other things. At block 1415, a probability of an object event may be assessed based at least in part on the image analysis based at least in part on the one or more parameters. The object event may include delivery of a package, pickup of a package, movement of a package, a person carrying a package, etc. At block 1420, a notification may be sent to a user based at least in part on the assessing of the probability. In some cases, a notification may be sent based at least in part on whether the probability exceeds a predetermined probability threshold.

Thus, the method 1400 may provide for doorbell camera package detection relating to automation/security systems. It should be noted that the method 1400 is just one implementation and that the operations of the method 1400 may be rearranged or otherwise modified such that other implementations are possible.

In some examples, aspects from the methods 1200, 1300, and 1400 may be combined and/or separated. It should be noted that the methods 1200, 1300, and 1400 are just example implementations, and that the operations of the methods 1200, 1300, and 1400 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for automation and/or security systems, comprising:
   detecting a presence of a first person at a first location;
   determining an identity of the first person based on one or more identifiers associated with the first person;
   in response to determining the first person's identity:
      determining a user preference associated with the identity of the first person; and
      recording a video using a camera at a location where the first person is located using default preferences of the user preference for the first person based on the first person's identity; and
   initiating an adjustment of a display parameter of the camera associated with the first video based at least in part on tracking the user's movement, the user preference, the identity of the first person, and the presence of the first person at the first location, wherein the adjustment of the display parameter is determined according to the identity of the first person, and wherein the display parameter comprises a video capture parameter of the camera, a video recording parameter of the camera, or both.

2. The method of claim 1, wherein determining the identity of the first person comprises:
   receiving data associated with the first person; and
   comparing the data to one or more user profiles, wherein determining the identity of the first person is based at least in part on the comparison.

3. The method of claim 2, wherein the data associated with the first person comprises a voice print, facial recognition information, one or more physical features, biometric information, or any combination thereof.

4. The method of claim 2, wherein the data associated with the first person comprises information of a card associated with the first person, a personal identification number, information indicating that a device of the first person is detected at the first location, or any combination thereof.

5. The method of claim 1, wherein the adjustment of the display parameter is initiated in accordance with one or more parameters of the user preference.

6. The method of claim 1, further comprising:
   tracking a movement of the first person from the first location to a second location, wherein initiating the adjustment of the display parameter of the first video is based at least in part on tracking the movement.

7. The method of claim 6, wherein the first location is within a same room as the second location.

8. The method of claim 6, wherein the first location is within a different room as the second location.

9. The method of claim 6, further comprising:
   displaying a second video at the second location based at least in part on tracking the movement of the first person from the first location to the second location.

10. The method of claim 1, wherein identifying the presence of the first person further comprises identifying the first person is located within an indoor room.

11. The method of claim 1, wherein adjusting the display parameter of the first video further comprises adjusting the display parameter of the first video during a video call.

12. The method of claim 1, wherein adjusting the display parameter of the first video further comprises adjusting a digital zoom level of the first video such that an image of the first person comprises a pre-determined percentage of an area of the display.

13. The method of claim 12, wherein adjusting the digital zoom level further comprises scaling the image of the first person using an interpolation algorithm.

14. The method of claim 1, wherein adjusting the display parameter of the first video further comprises:
receiving data indicating a quality of the first video; and
wherein initiating the adjustment of the display parameter further comprises adjusting the quality of the first video.

15. The method of claim 1, further comprising:
comparing a first portion of the first video and a second portion of the first video; and
determining that a section of the first video is backlit based at least in part on the comparing, wherein initiating the adjustment comprises adjusting a focus on the first person based at least in part on the determining the section of the first video is backlit.

16. The method of claim 1, wherein capturing the first video related to the first person comprises:
capturing the first video upon determining the first person is creating an audible noise; and
identifying a second presence of a second person at a second location.

17. The method of claim 16, further comprising:
determining the first person and/or the second person is creating the audible noise; and
adjusting the display of the first video to include the first person and the second person.

18. The method of claim 16, further comprising: determining that the second person is creating the audible noise; and adjusting the display of the first video to include an image of the second person.

19. An apparatus for security and/or automation systems, comprising:
a processor;
memory in electronic communication with the processor; and
instructions stored in the memory, the instructions causing the processor to:
detect a presence of a first person at a first location;
determine an identity of the first person based on one or more identifiers associated with the first person;
in response to determining the first person's identity:
determine a user preference associated with the identity of the first person; and
record a video using a camera at a location where the first person is located using default preferences of the user preference for the first person based on the first person's identity; and
initiate an adjustment of a display parameter of the camera associated with the first video based at least in part on tracking the user's movement, the user preference, the identity of the first person, and the presence of the first person at the first location, wherein the adjustment of the display parameter is determined according to the identity of the first person, and wherein the display parameter comprises a video capture parameter of the camera, a video recording parameter of the camera, or both.

20. A non-transitory computer-readable medium storing code, the code comprising instructions executable to:
detect a presence of a first person at a first location;
determine an identity of the first person based on one or more identifiers associated with the first person;
in response to determining the first person's identity:
determine a user preference associated with the identity of the first person; and
record a video using a camera at a location where the first person is located using default preferences of the user preference for the first person based on the first person's identity; and
initiate an adjustment of a display parameter of the camera associated with the first video based at least in part on tracking the user's movement, the user preference, the identity of the first person, and the presence of the first person at the first location, wherein the adjustment of the display parameter is determined according to the identity of the first person, and wherein the display parameter comprises a video capture parameter of the camera, a video recording parameter of the camera, or both.

* * * * *